(12) United States Patent
Dobizl et al.

(10) Patent No.: US 10,562,062 B2
(45) Date of Patent: Feb. 18, 2020

(54) MATERIAL SUPPLY SYSTEM WITH VALVE ASSEMBLY

(71) Applicant: Ecolab USA Inc., St. Paul, MN (US)

(72) Inventors: Kenneth Thomas Dobizl, Mounds View, MN (US); Thaddeus Hans Feiler, South St. Paul, MN (US); Brock Stephen Mueggenborg, St. Paul, MN (US); Daniel Davis Anderson, Eagan, MN (US)

(73) Assignee: Ecolab USA Inc., St. Paul, MN (US)

( * ) Notice: Subject to any disclaimer, the term of this patent is extended or adjusted under 35 U.S.C. 154(b) by 62 days.

(21) Appl. No.: 15/814,726

(22) Filed: Nov. 16, 2017

(65) Prior Publication Data

US 2018/0141076 A1    May 24, 2018

Related U.S. Application Data

(60) Provisional application No. 62/424,807, filed on Nov. 21, 2016.

(51) Int. Cl.
*F16K 15/02* (2006.01)
*B65G 69/18* (2006.01)
(Continued)

(52) U.S. Cl.
CPC ........ *B05C 11/1028* (2013.01); *B05B 7/2486* (2013.01); *B65G 69/183* (2013.01);
(Continued)

(58) Field of Classification Search
CPC ........ F16K 3/08; F16K 11/074; F16K 27/045; F16K 11/076; F16K 3/085; B65G 69/183;
(Continued)

(56) References Cited

U.S. PATENT DOCUMENTS 2,029,219 A   1/1936   Bourland
2,105,589 A   1/1938   Eades
(Continued)

FOREIGN PATENT DOCUMENTS

AR          242752 A1     5/1993
AU       2003237240 B9    2/2004
(Continued)

OTHER PUBLICATIONS

European Patent Office, International Search Report in International Patent Application No. PCT/US2017/061939, dated Feb. 27, 2018, 5 pp.

(Continued)

*Primary Examiner* — Marina A Tietjen
(74) *Attorney, Agent, or Firm* — Leydig, Voit & Mayer, Ltd.

(57) ABSTRACT

A material supply assembly includes a valve assembly having an outer valve member and an inner valve member rotatable relative to the outer valve member. A base assembly includes an base structure and an actuator. An engagement structure is operative between the outer valve member and the actuator to prevent relative movement between the outer valve member and the actuator. A locking structure is operative between the inner valve member and the base structure to prevent relative movement between the inner valve member and the base structure. Movement of the actuator relative to the base structure moves the outer valve member relative to the inner valve member to operate the valve assembly.

20 Claims, 30 Drawing Sheets

(51) Int. Cl.
*B05C 11/10* (2006.01)
*B05B 7/24* (2006.01)
*F16J 15/34* (2006.01)
*F16K 1/20* (2006.01)
*B05B 1/30* (2006.01)
*F16J 15/48* (2006.01)
*F16K 1/54* (2006.01)

(52) U.S. Cl.
CPC ............ *F16J 15/3436* (2013.01); *F16K 1/205* (2013.01); *F16K 15/026* (2013.01); *B05B 1/304* (2013.01); *F16J 15/48* (2013.01); *F16K 1/54* (2013.01)

(58) Field of Classification Search
CPC ..... F17C 13/04; B65D 47/046; B65D 47/265; B67D 3/0032; B67C 11/04; B67C 11/06; Y10T 137/86743
USPC ......... 141/346, 368, 32–321, 331, 335, 344, 141/363–366, 349; 222/472, 452, 370, 222/142.9, 485, 548; 251/89.5, 143, 251/147–148, 149.2, 149.5, 152, 156, 251/208, 210–212; 137/599.02
See application file for complete search history.

(56) References Cited

U.S. PATENT DOCUMENTS

| | | | |
|---|---|---|---|
| 3,225,963 A | 12/1965 | Arpajian |
| 3,239,111 A | 3/1966 | La Croce |
| 3,308,995 A | 3/1967 | Lee et al. |
| 3,327,905 A | 6/1967 | Gould |
| 3,773,221 A | 11/1973 | Lesk et al. |
| 4,021,021 A | 5/1977 | Hall et al. |
| 4,095,723 A | 6/1978 | Lemer |
| 4,212,415 A | 6/1980 | Neely |
| 4,274,563 A | 6/1981 | Otterson |
| 4,349,157 A | 9/1982 | Beiswenger et al. |
| 4,366,920 A | 1/1983 | Greenfield, Jr. et al. |
| 4,376,497 A | 3/1983 | Mumford |
| 4,429,815 A | 2/1984 | Libit |
| 4,548,331 A | 10/1985 | Montgomery |
| 4,586,459 A | 5/1986 | Schultz |
| 4,613,063 A | 9/1986 | Wright |
| 4,828,130 A | 5/1989 | Hofmann |
| RE33,083 E | 10/1989 | Pellegrino |
| 4,892,233 A | 1/1990 | Zelickson |
| 5,172,740 A | 12/1992 | Simmel et al. |
| 5,261,432 A | 11/1993 | Sandrin |
| 5,322,085 A | 6/1994 | Prothe |
| 5,407,107 A | 4/1995 | Smith |
| 5,495,962 A | 3/1996 | Nomura |
| 5,513,776 A | 5/1996 | Canini |
| 5,582,162 A | 12/1996 | Petersson |
| 5,601,213 A | 2/1997 | Daniello |
| 5,609,458 A | 3/1997 | Hanaoka et al. |
| 5,687,782 A | 11/1997 | Cleveland et al. |
| 5,967,383 A | 10/1999 | Hidalgo |
| 6,085,809 A | 7/2000 | Woodruff |
| 6,179,164 B1 | 1/2001 | Fuchs |
| 6,193,116 B1 | 2/2001 | Sheffler et al. |
| 6,257,172 B1 | 7/2001 | Leppanen |
| 6,283,339 B1 | 9/2001 | Morrow |
| 6,305,443 B1 | 10/2001 | Semenenko |
| 6,311,745 B1 | 11/2001 | Welch et al. |
| D479,801 S | 9/2003 | Carmichael et al. |
| 6,886,719 B1 | 5/2005 | Shen et al. |
| 6,988,642 B2 | 1/2006 | Gallo, Jr. et al. |
| 7,073,546 B2 | 7/2006 | Woodruff |
| 7,438,204 B2 | 10/2008 | Conway et al. |
| 7,980,277 B2 | 7/2011 | Amano |
| D677,987 S | 3/2013 | High |
| 8,833,614 B2 | 9/2014 | Webster et al. |
| 9,139,963 B2 | 9/2015 | Zwahlen et al. |
| 2002/0125275 A1 | 9/2002 | Smith |
| 2002/0145010 A1 | 10/2002 | Ufheil et al. |
| 2002/0145013 A1 | 10/2002 | Chrisman et al. |
| 2003/0159751 A1 | 8/2003 | Chamba |
| 2004/0079765 A1 | 4/2004 | Gallo, Jr. et al. |
| 2005/0103337 A1 | 5/2005 | Hickey et al. |
| 2005/0247742 A1 | 11/2005 | Livingston et al. |
| 2005/0263373 A1 | 12/2005 | Boevers |
| 2006/0027609 A1 | 2/2006 | Landau et al. |
| 2006/0070999 A1 | 4/2006 | Stull et al. |
| 2006/0191958 A1 | 8/2006 | Brundick |
| 2006/0278665 A1 | 12/2006 | Bennett |
| 2007/0034642 A1 | 2/2007 | Pendleton |
| 2007/0084885 A1 | 4/2007 | Conway et al. |
| 2007/0181600 A1 | 8/2007 | Ben-Shlomo et al. |
| 2008/0054014 A1 | 3/2008 | Webster et al. |
| 2008/0072993 A1 | 3/2008 | Luchinger et al. |
| 2008/0093394 A1 | 4/2008 | Peterson et al. |
| 2009/0127289 A1 | 5/2009 | Keller |
| 2009/0145510 A1 | 6/2009 | Luechinger |
| 2009/0188517 A1 | 7/2009 | Thorpe et al. |
| 2009/0188518 A1 | 7/2009 | Thorpe et al. |
| 2009/0258547 A1 | 10/2009 | Pardikes |
| 2009/0309006 A1 | 12/2009 | Johnsgaard |
| 2010/0012120 A1 | 1/2010 | Herder et al. |
| 2010/0204441 A1 | 8/2010 | Pardikes |
| 2011/0099950 A1 | 5/2011 | Dunn et al. |
| 2011/0101023 A1 | 5/2011 | Chan et al. |
| 2012/0080457 A1 | 4/2012 | Lovinger et al. |
| 2012/0267401 A1 | 10/2012 | Schroedter |
| 2013/0167972 A1 | 7/2013 | Peressoni |
| 2014/0103153 A1 | 4/2014 | Below |
| 2014/0166439 A1 | 6/2014 | Hughes |
| 2014/0230963 A1 | 8/2014 | Simon et al. |
| 2015/0021364 A1 | 1/2015 | Zehnder et al. |

FOREIGN PATENT DOCUMENTS

| | | |
|---|---|---|
| AU | 2005204344 A1 | 4/2006 |
| CA | 1082475 A | 7/1980 |
| CA | 1113734 A | 12/1981 |
| CA | 1254172 A | 5/1989 |
| CA | 1306979 C | 9/1992 |
| CA | 2152088 A1 | 7/1994 |
| CA | 2012098 C | 11/1994 |
| CA | 2237351 A1 | 11/1998 |
| CA | 2152088 C | 12/1999 |
| CN | 200981706 Y | 11/2007 |
| CN | 200985145 Y | 12/2007 |
| CN | 201686132 U | 12/2010 |
| CN | 202193332 U | 4/2012 |
| CN | 102923390 A | 2/2013 |
| CN | 204471651 U | 7/2015 |
| EP | 0115321 A2 | 8/1984 |
| EP | 0664667 B1 | 3/1998 |
| EP | 0923993 A1 | 6/1999 |
| EP | 1500911 A1 | 1/2005 |
| EP | 1902956 A1 | 3/2008 |
| EP | 2447186 B1 | 5/2012 |
| EP | 2632302 B2 | 7/2014 |
| GB | 2288169 A | 10/1995 |
| GB | 2295609 A | 6/1996 |
| GB | 2296711 A | 7/1996 |
| GB | 2328926 A | 3/1999 |
| GB | 2448236 A | 10/2008 |
| GB | 2457110 A | 8/2009 |
| GB | 2457111 A | 8/2009 |
| GB | 2489721 A | 10/2012 |
| JP | H03-216697 A | 9/1991 |
| JP | 4206175 B2 | 1/2009 |
| NZ | 20060544807 | 11/2007 |
| WO | WO 85/00156 A1 | 1/1985 |
| WO | WO 88/07324 A1 | 10/1988 |
| WO | WO 88/08269 A1 | 11/1988 |
| WO | WO 95/15893 A1 | 6/1995 |
| WO | WO 96/04410 A1 | 2/1996 |
| WO | WO 97/30743 A1 | 8/1997 |
| WO | WO 99/44663 A1 | 9/1999 |
| WO | WO 03/093773 A1 | 11/2003 |

(56) References Cited

FOREIGN PATENT DOCUMENTS

| WO | WO 2004/041435 A2 | 5/2004 |
| WO | WO 2006/119324 A2 | 11/2006 |
| WO | WO 2007/120133 A2 | 10/2007 |
| WO | WO 2007/141601 A1 | 12/2007 |
| WO | WO 2009/050710 A2 | 4/2009 |
| WO | WO 2010/150087 A1 | 12/2010 |
| WO | WO 2013/010702 A1 | 1/2013 |
| WO | WO 2014/031474 A2 | 2/2014 |
| WO | WO 2015/158724 A1 | 10/2015 |
| WO | WO 2016/016649 A1 | 2/2016 |
| WO | WO 2016/019299 A1 | 2/2016 |
| WO | WO 2018/093992 A1 | 5/2018 |
| WO | WO 2018/093995 A1 | 5/2018 |

OTHER PUBLICATIONS

European Patent Office, Written Opinion in International Patent Application No. PCT/US2017/061939, dated Feb. 27, 2018, 6 pp.

MATERIAL SUPPLY SYSTEM WITH VALVE ASSEMBLY

This application is a nonprovisional application claiming the benefit of U.S. Provisional Patent Application Ser. No. 62/424,807, filed Nov. 21, 2016, the disclosure of which is incorporated herein by reference in its entirety.

TECHNICAL FIELD

The present disclosure relates generally to valve systems and, more particularly, to valve assembly mountable on a base to control the flow of material or substances through the valve assembly and the base.

BACKGROUND

Valve systems are used to control the flow of powdered or granular materials from sealed containers within closed loop material feed systems. Such valve systems may include first and second components that are rotatable relative to each other to open and close a valve assembly. While existing valve systems may perform well under some conditions, operation may be challenging depending upon the characteristics of the materials or substances within the containers. Accordingly, an improved valve system for use with a variety of materials or substances would be desirable.

SUMMARY

An improved material supply assembly is provided. The material supply assembly comprises a valve assembly and a base assembly. The valve assembly includes an outer valve member and an inner valve member. The outer valve member includes an outer discharge section, with the outer discharge section having a plurality of first openings therein. The inner valve member includes an inner discharge section, with the inner discharge section having a plurality of second openings therein. The inner valve member is rotatably disposed on the outer valve member and rotatable relative to the outer valve member between a closed position at which the valve assembly is closed and an open position at which the valve assembly is open. At the open position, the plurality of first openings are aligned with the plurality of second openings. The base assembly has a receptacle with an inlet and an outlet, with the inlet being configured to receive at least a portion of the valve assembly therein and the outlet being configured to pass material therethrough. The base assembly includes a base structure and an actuator, with the actuator being movable relative to the base structure. An engagement structure is operative between the outer valve member and the actuator. The engagement structure includes a plurality of spaced apart first engagement members on one of the outer valve member and the actuator and a plurality of complementary configured second engagement members on another of the outer valve member and the actuator. The first engagement members is configured to lockingly engage the second engagement members to prevent relative movement between the outer valve member and the actuator. A locking structure is operative between the inner valve member and the base structure. The locking structure includes a plurality of spaced apart first locking members on one of the inner valve member and the base structure and a plurality of complementary configured second locking members on another of the inner valve member and the base structure. The first locking members are configured to lockingly engage the second locking members to prevent relative movement between the inner valve member and the base structure.

An improved material supply assembly with locking arms is provided. The material supply assembly comprises a valve assembly and a base assembly. The valve assembly includes an outer valve member and an inner valve member. The outer valve member includes an annular outer body section and an outer discharge section, with the outer discharge section having a plurality of first openings therein. The inner valve member includes an annular inner body section and an inner discharge section, with the inner discharge section having a plurality of second openings therein. The inner valve member is rotatably disposed on the outer valve member and rotatable relative to the outer valve member between a closed position at which the valve assembly is closed and an open position at which the valve assembly is open. At the open position, the plurality of first openings are aligned with the plurality of second openings. The base assembly has a receptacle with an inlet and an outlet, with the inlet being configured to receive at least a portion of the valve assembly therein and the outlet being configured to pass material therethrough. The base assembly includes a base structure and an actuator, with the actuator being rotatable relative to the base structure. An engagement structure is operative between the outer valve member and the actuator. The engagement structure includes a plurality of spaced apart first engagement members on one of the outer valve member and the actuator and a plurality of complementary configured second engagement members on another of the outer valve member and the actuator. The first engagement members is configured to lockingly engage the second engagement members to prevent relative rotation between the outer valve member and the actuator. A locking structure is operative between the inner valve member and the base structure. The base structure includes a plurality of resilient locking arms, with each locking arm including a plurality of spaced apart first locking members. The inner valve member includes a plurality of complementary configured second locking members. The first locking members is configured to lockingly engage the second locking members to prevent relative rotation between the inner valve member and the base structure. Each resilient locking arm is movable between a first unlocked position and a second locked position, wherein at the first unlocked position, the first locking members are spaced from the second locking members, and at the second locked position, the first locking members engage the second locking members.

An improved material supply assembly with locking arms and a removal prevention structure is provided. The material supply assembly comprises a valve assembly and a base assembly. The valve assembly includes an outer valve member and an inner valve member. The outer valve member includes an annular outer body section and an outer discharge section, with the outer discharge section having a plurality of first openings therein. The inner valve member includes an annular inner body section and an inner discharge section, with the inner discharge section having a plurality of second openings therein. The inner valve member is rotatably disposed on the outer valve member and rotatable relative to the outer valve member between a closed position at which the valve assembly is closed and an open position at which the valve assembly is open. At the open position, the plurality of first openings are aligned with the plurality of second openings. The base assembly has a receptacle with an inlet and an outlet, with the inlet being configured to receive at least a portion of the valve assembly therein and the outlet being configured to pass material therethrough. The base assembly includes an annular base structure and an annular actuator, with the actuator being rotatable relative to the base structure. An engagement structure is operative between the outer valve member and the actuator. The engagement structure includes a plurality of spaced apart first engagement members on one of the outer valve member and the actuator and a plurality of complementary configured second engagement members on another of the outer valve member and the actuator. The first engagement members is configured to lockingly engage the second engagement members to prevent relative rotation between the outer valve member and the actuator. A locking structure is operative between the inner valve member and the base structure. The base structure includes a plurality of resilient locking arms, with each locking arm including a plurality of spaced apart first locking members and a locking surface. The inner valve member includes a plurality of complementary configured second locking members. The first locking members is configured to lockingly engage the second locking members to prevent relative rotation between the inner valve member and the base structure. The locking surface is configured to prevent removal of the inner valve member from the base assembly. Each resilient locking arm is movable between a first unlocked position and a second locked position, wherein at the first unlocked position, the first locking members are spaced from the second locking members, and at the second locked position, the first locking members engage the second locking members and the locking surface overlies a portion of the inner valve member to prevent removal of the inner valve member from the base assembly.

DETAILED DESCRIPTION

Figure 1:
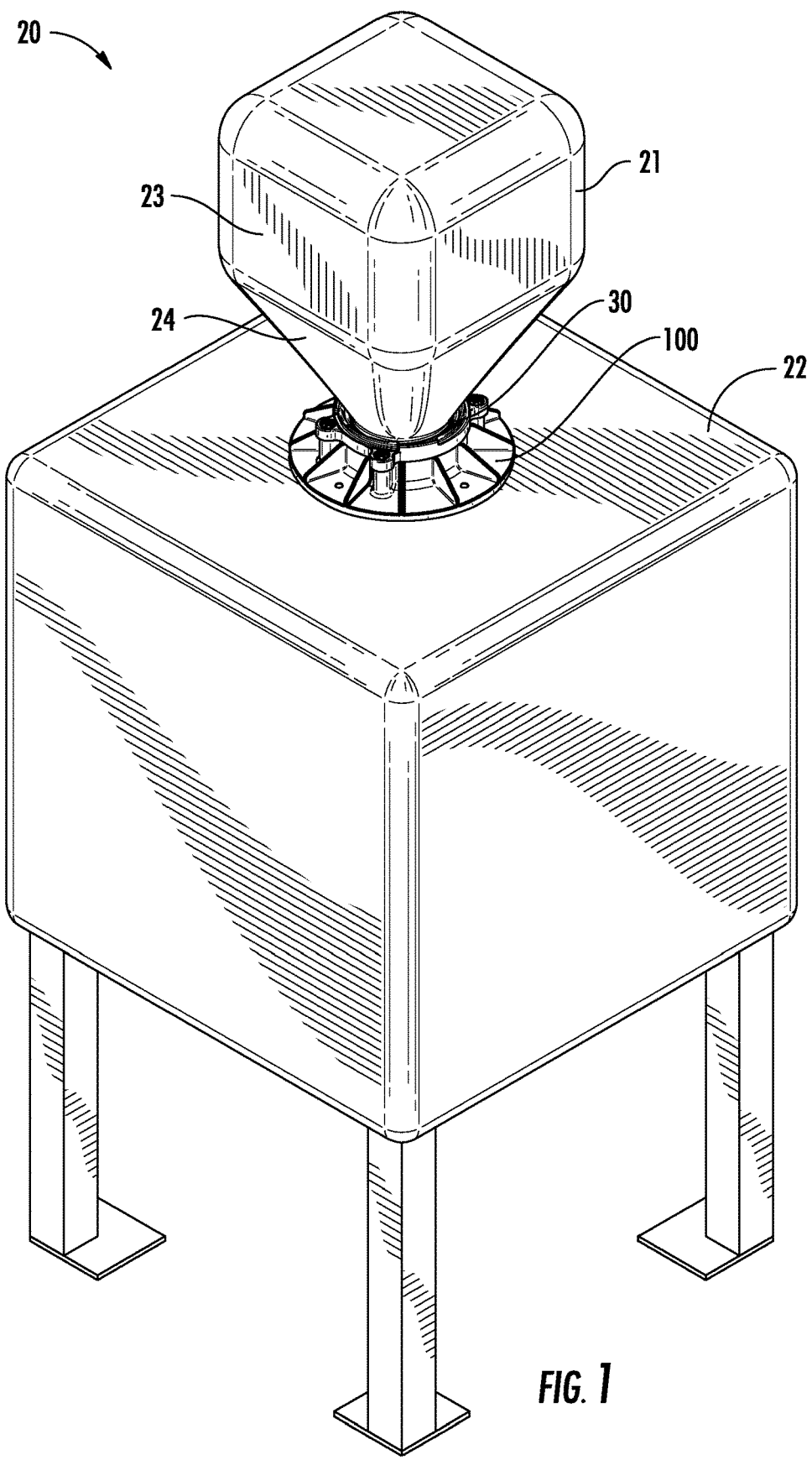
FIG. 1 is a perspective view of a product supply system in accordance with the principles of the present disclosure.
Figure 2:
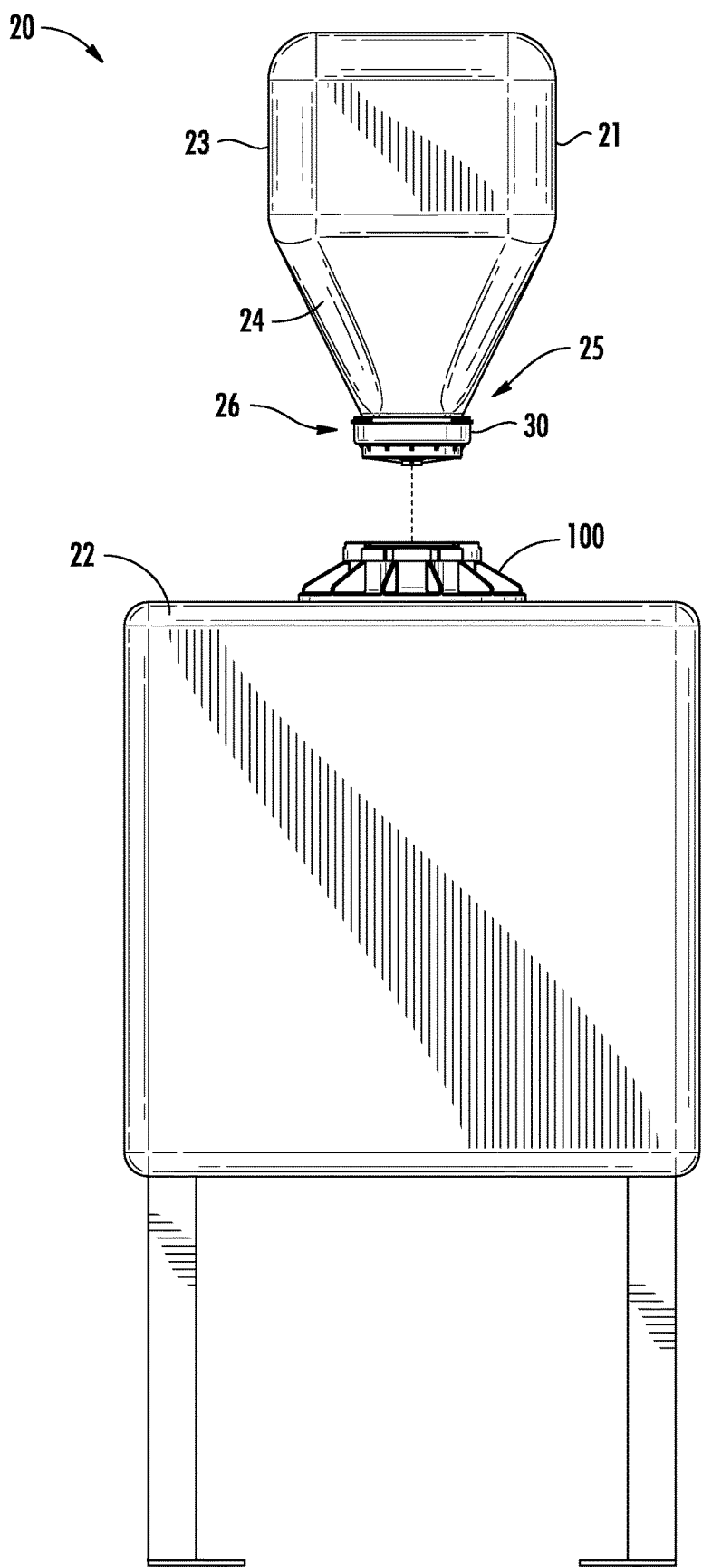
FIG. 2 is a side view of the product supply system of FIG. 1.

Referring to FIG. 1, a material supply system 20 includes a container 21 secured to a fitment or valve assembly 30 and a docking station or base 100 mounted on a feed mechanism 22. The valve assembly 30 may be removably secured to the base 100 to form a valve system that is part of closed loop material feed system. The container 21 may have any desired configuration and, as depicted, may include a closed body section 23 and a tapered section 24. A lower portion 25 (FIG. 2) of the container 21 includes an opening (not shown)

through which material within the body section 23 may be discharged. The lower portion 25 of the container 21 includes a mounting section 26 for securing the container 21 to the valve assembly 30. The mounting section 26 may be secured to the valve assembly 30 in any desired manner. In one embodiment, the mounting section 26 may include a plurality of threads (not shown) for threadingly engaging threads 37 on the valve assembly 30. In another embodiment, the mounting section 26 may be secured to the valve assembly 30 with an adhesive. In still another embodiment, the mounting section 26 and the valve assembly 30 may have a structure (not shown) to snap-fit the mounting section into the valve assembly.

Figure 6:
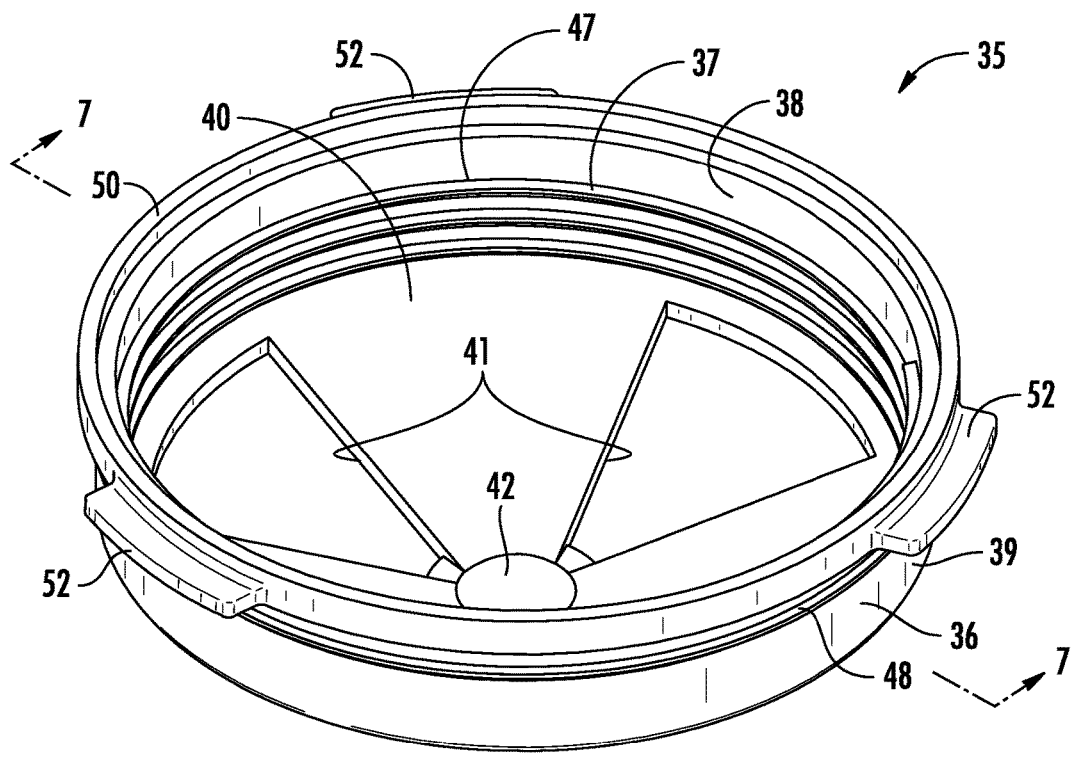
FIG. 6 is a perspective view of an inner valve member of the valve assembly.
Figure 7:
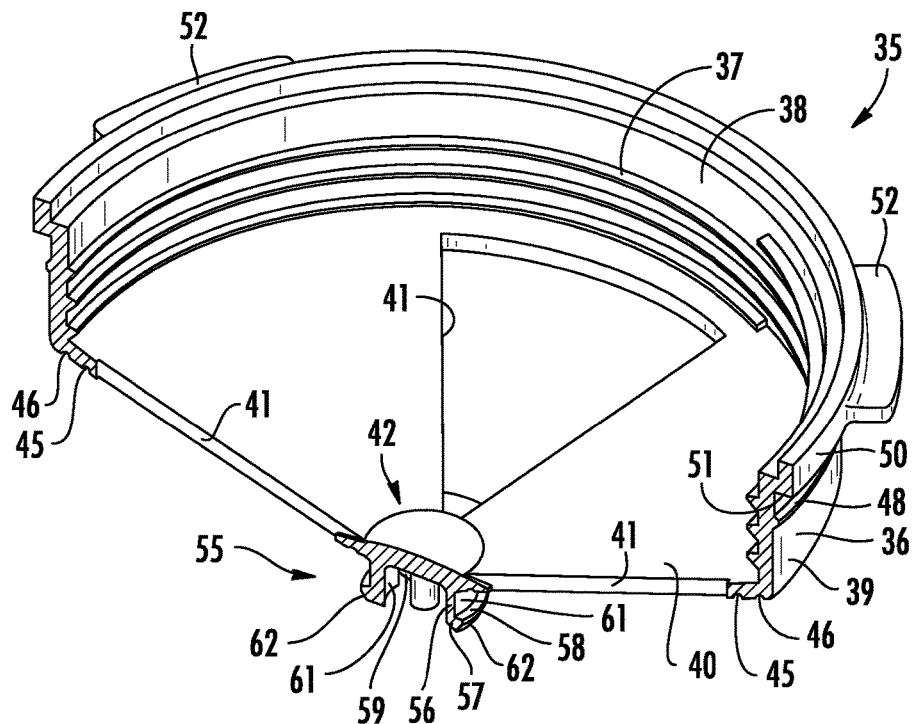
FIG. 7 is a sectional view taken generally along line 7-7 in FIG. 6.
Figure 8:
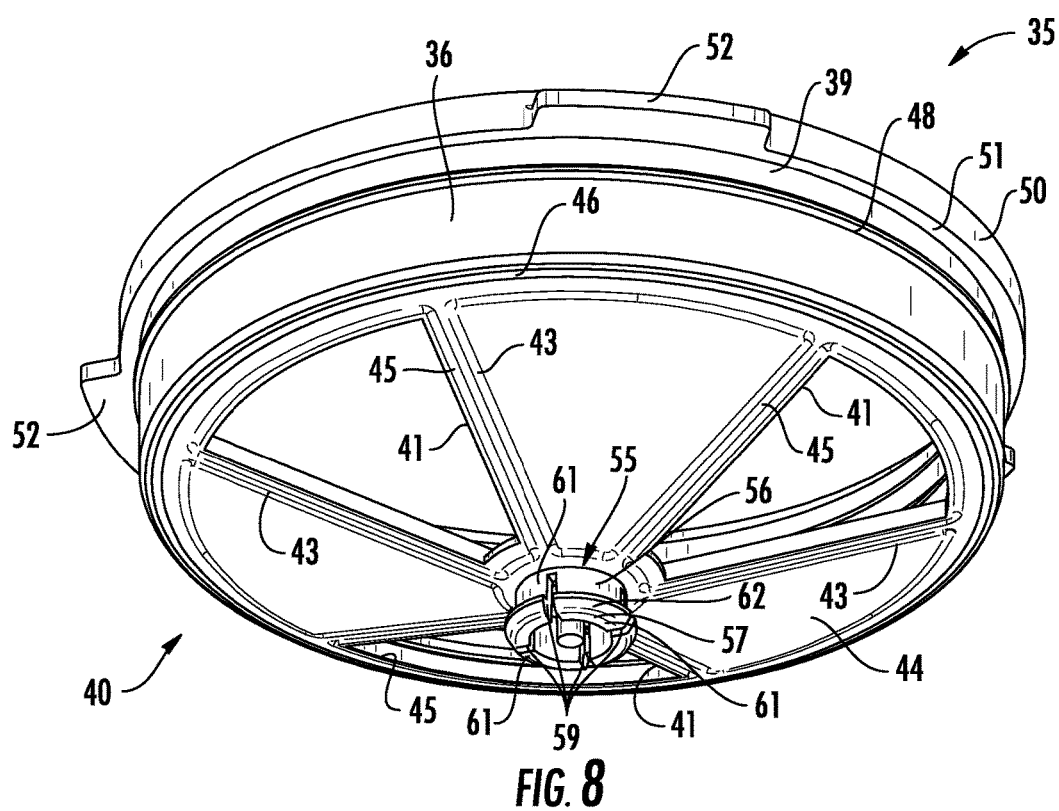
FIG. 8 is a perspective view of the inner valve member of FIG. 6 but taken from a perspective below the inner valve member.

The valve assembly 30 includes an inner valve member 35 that is rotatably mounted on and within outer valve member 65. Referring to FIGS. 6-8, the inner valve member 35 has an annular body section 36 with a tapered lower discharge section 40. The annular body section 36 may include threads 37 on an inner surface 38 thereof configured to sealingly engage the threads on the mounting section 26 of container 21. In an embodiment in which the container 21 is secured to the inner valve member 35 without threads, the inner surface 38 of the annular body section 36 may be smooth or have another configuration to assist in sealingly engaging the mounting section 26 of the container 21. The inner surface 38 may also include one or more annular grooves (not shown) to receive adhesive and/or an O-ring therein.

The discharge section 40 includes a plurality of openings 41 that extend generally from the body section 36 to the center section 42 of the inner valve member 35. Although depicted with three generally triangularly-shaped openings 41 that are evenly spaced apart, the lower discharge section 40 may include any number and configuration of openings provided that they permit the desired flow rate from the container 21 through the valve assembly 30. In an additional embodiment, the number of openings 41 may be approximately five. In still another embodiment, the number of openings 41 may be approximately ten or more.

In order to seal the valve assembly 30, a sealing channel or recess 43 (FIG. 8), which forms half of a seal assembly associated with the each opening 71 in outer valve member 65, may extend into the lower surface 44 of the discharge section 40 and in a shape that generally conforms to the shape of each opening 41. As depicted, sealing channels 43 are generally triangularly-shaped and generally match the shape of openings 41. In addition, a locking channel or recess 45 that is identical or similar to sealing channel 43 may extend into the lower surface 44 of the discharge section 40 and generally surrounds or encircles each opening 41.

To provide additional sealing capabilities, an additional annular sealing channel or recess 46, which forms half of a circumferential seal assembly, may extend into the lower surface 44 of the discharge section 40 generally adjacent the intersection 47 of the body section 36 and the discharge section.

Still another or alternate circumferential seal may be provided around the annular body section 36, if desired. For example, an annular upper seal projection 48, which forms half of a second circumferential seal assembly positioned to encircle the annular body section 36, may extend around the outer surface 39 of the annular body section generally adjacent the intersection 47 of the body section and the discharge section.

The upper portion of annular body section 36 may be configured as an enlarged annular portion 50 having an outer diameter greater than that of outer surface 39 of the main portion of the annular body section to define a lower or downwardly facing edge 51. A plurality of annular projections or operating tabs 52 may extend radially outward from the enlarged annular portion 50. As depicted, the inner valve member 35 includes three equally spaced operating tabs 52 but any number of tabs may be used.

A retention section 55 may extend downwardly from the center section 42 of the discharge section 40. The retention section 55 includes an annular axle section 56 about which the outer valve member 65 may rotate. An annular section 57 at the lower end of annular axle section 56 has a greater diameter than the annular axle section to define a locking shoulder 58. The annular axle section 56 and the annular section 57 include slots 59 that extend from the lower surface 60 of the annular section 57 towards the center section 42 of discharge section 40 so that the retention section 55 defines four flexible or deflectable arms 61. The annular section 57 includes a tapered lower surface 62 to facilitate deflection of the arms 61 while mounting the outer valve member 65 onto the retention section 50.

Figure 9:
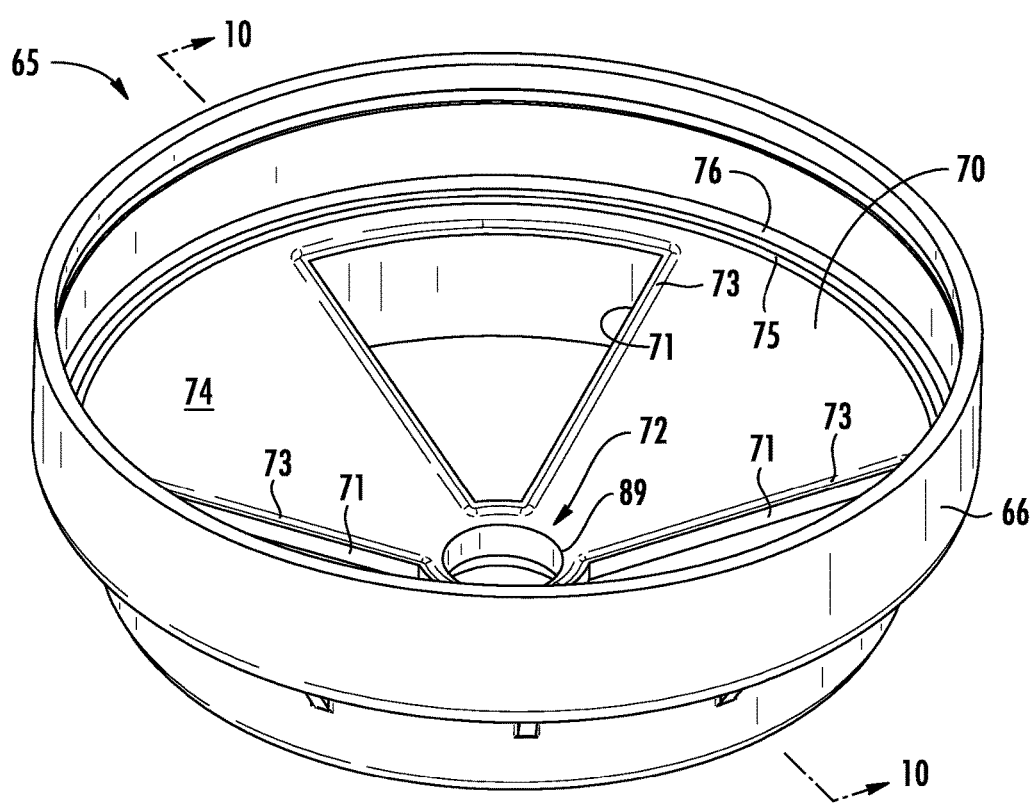
FIG. 9 is a perspective view of an outer valve member of the valve assembly.
Figure 10:
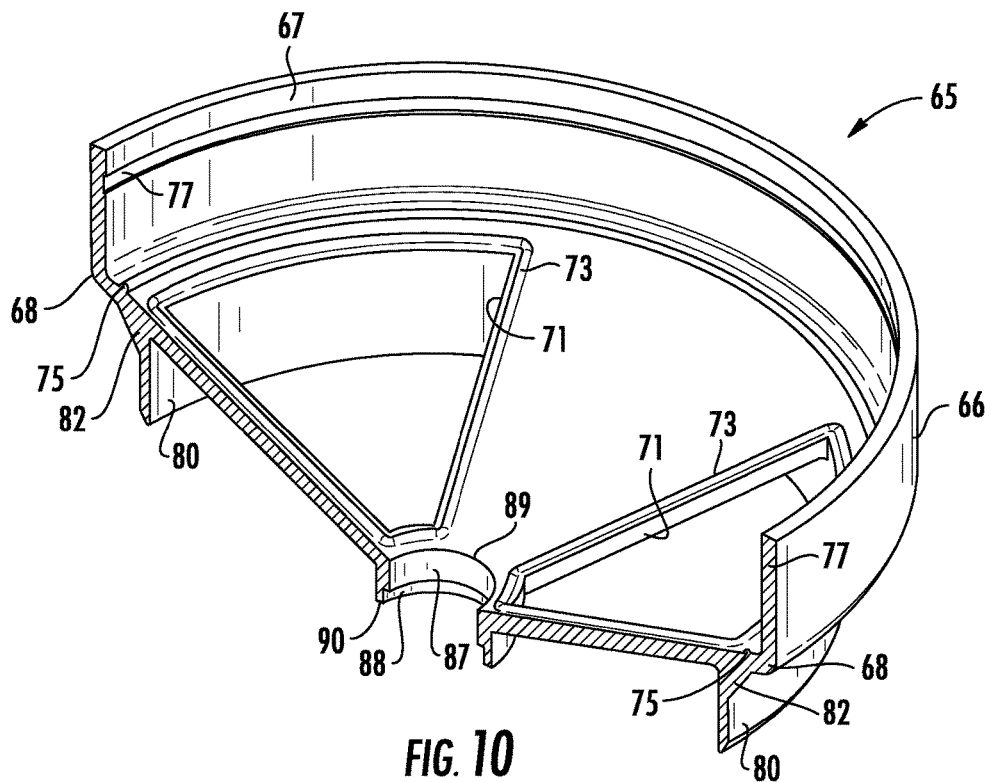
FIG. 10 is a sectional view taken generally along line 10-10 in FIG. 9.
Figure 11:
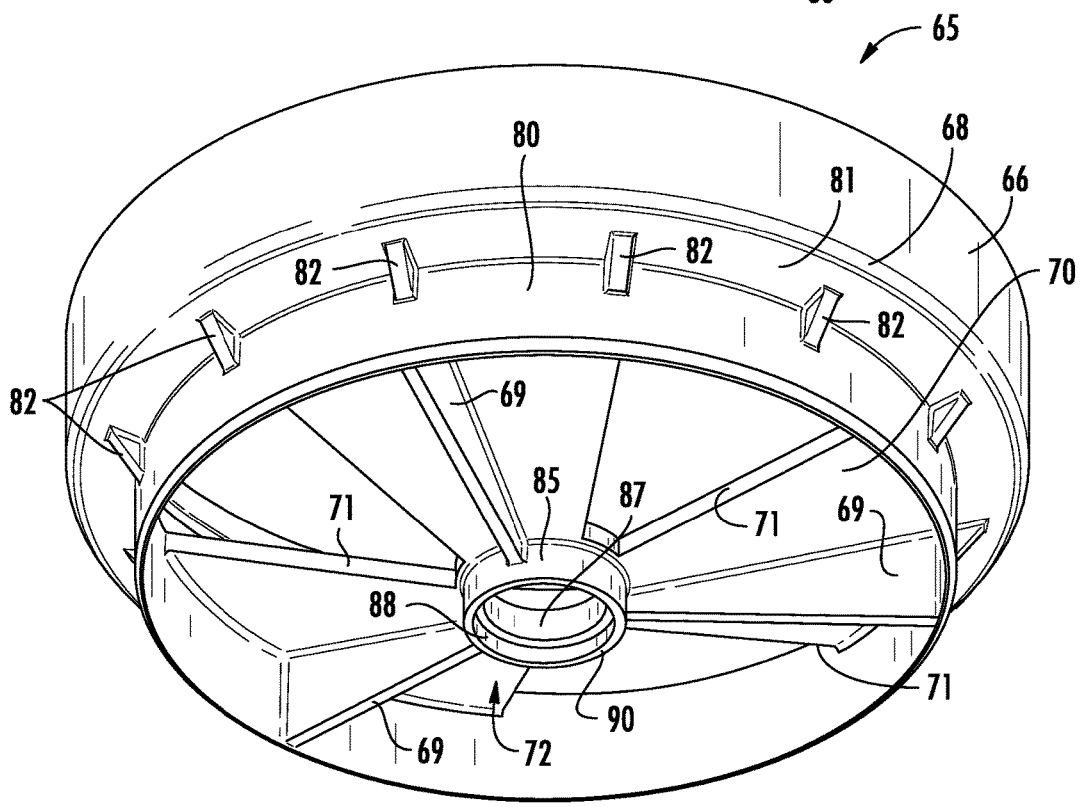
FIG. 11 is a perspective view of the outer valve member of FIG. 9 but taken from a perspective below the outer valve member.
Figure 13:
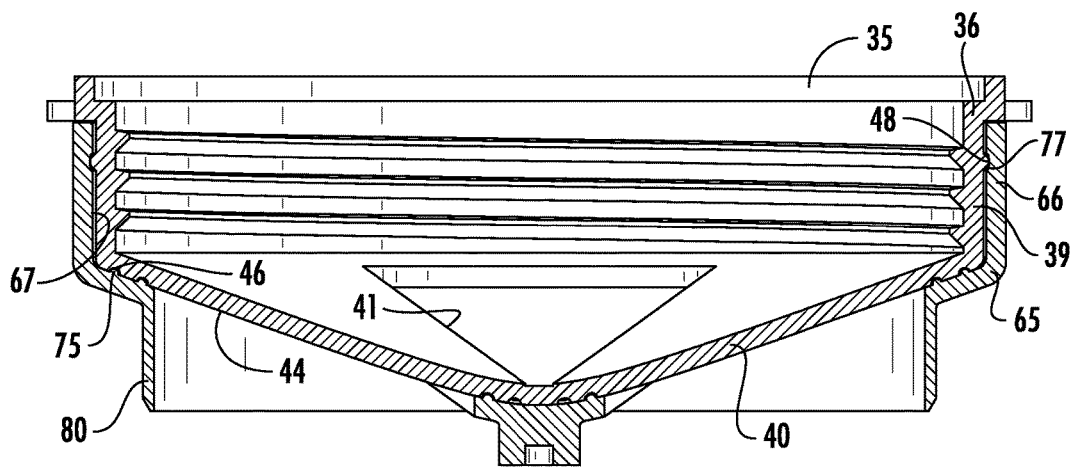
FIG. 13 is a sectional view similar to FIG. 12 but with the inner valve member fully inserted into the outer valve member.

Referring to FIGS. 9-11, the outer valve member 65 is configured to receive the inner valve member 35 therein. Outer valve member 65 has an annular body section 66 with a tapered lower discharge section 70. The annular body section 66 is dimensioned to receive the annular body section 36 of inner valve member 35 in a closely spaced relationship and the discharge section 70 is dimensioned to receive the discharge section 40 of the inner valve member 35 in a closely spaced relationship (FIG. 13).

The discharge section 70 includes a plurality of openings 71 that extend generally from the body section 66 to the center section 72 of the outer valve member 65. The openings 71 may be identical in number and in size to the openings 41 in the inner valve member 35. Accordingly, as depicted, the discharge section 70 includes three generally triangularly-shaped openings 71.

In order to seal the openings 71, a projection 73 surrounding each opening 71 may extend upward from the upper surface 74 of the discharge section 70 in a configuration (e.g., shape and size) that is identical to or closely matches the sealing channel 43 in the lower surface 44 of discharge section 40 of inner valve member 35. Upon positioning the projection 73 within channel 43, the projection interacts with the channel to form a seal assembly that seals the opening 71 and prevent material within the container 21 from passing through the valve assembly 30.

In addition to interacting with the sealing channels 43 to seal the openings 71, the projections 73 may also interact with the locking channels 45 that surround the openings 41 in inner valve member 35. In one aspect, the interaction between the locking channels 45 and the projections 73 assists in maintaining the valve assembly 30 in an open position (i.e., with the openings 41 in the inner valve member and the opening 71 in the outer valve member 65 aligned). In another aspect, the interaction between the locking channels 45 and the projections 73 provide tactile feedback as to when the valve assembly has reached its fully open position. In an alternate embodiment, other structures such as projections and channels of other configurations may be provided between the inner valve member 35 and the outer valve member 65 to provide the locking and/or tactile feedback functionality.

An annular sealing projection 75 may extend from the upper surface 74 of the discharge section 70 generally adjacent the intersection 76 of the body section 66 and the discharge section. The sealing projection 75 has a configuration that is identical to or closely matches that of the annular channel 46 in the lower surface 44 of discharge section 40 of inner valve member 35. The sealing projection 75 is positioned so as to be aligned with channel 46 of inner valve member 35 upon positioning the inner valve member within the outer valve member 65. Upon positioning the projection 75 within the channel 46, the projection interacts with the channel to provide a circumferential seal structure or assembly to prevent or reduce the likelihood that material from the container 21 will pass through the valve assembly 30 or escape from the closed loop material feed system.

An annular upper seal channel or recess 77 may extend within the inner surface 67 of the body section 66. The upper seal channel 77 may have a configuration that is identical to or closely matches that of the annular upper seal projection 48 of the annular body section 36 of inner valve member 35. The upper seal channel 77 is positioned so as to be aligned with upper seal projection 48 of inner valve member 35 upon positioning the inner valve member within the outer valve member 65. Upon positioning the upper seal projection 48 within the upper seal channel 77, the projection interacts with the channel to provide an additional circumferential seal structure or assembly to prevent or reduce the likelihood that material from the container 21 will pass through the valve assembly or escape from the closed loop material feed system.

Although described with each projection having a configuration that is identical to or closely matches the recess into which it is positioned, in some instances, the projections and recesses may have different configurations in order to optimize their sealing function.

The lower portion of the outer valve member 65 includes an outer annular alignment ring 80 extending downwardly from the discharge section 70 that is centered about center section 72. A portion of the lower surface of discharge section 70 forms a lower angled or tapered mounting surface 81 that extends from a lower edge 68 of the body section 66 to the alignment ring 80. Although depicted with an angled surface that angles downward towards the center of the outer valve member 65, in another embodiment, the alignment surface 81 may be generally horizontal rather than angled downward towards the alignment ring 80. A plurality of downwardly projecting engagement tabs or projections 82 extend between the body section 66 and the alignment ring 80 from the lower angled mounting surface 81. In one embodiment, the engagement tabs 82 may be equally spaced apart.

The lower portion of the outer valve member 65 further includes an inner annular ring 85 centered about center section 72. The inner annular ring 85 is configured to receive therein the retention section 55 of inner valve member 35 to define a securement structure that secures the inner valve member and the outer valve member 65 together. More specifically, inner annular ring 85 has a stepped inner diameter with upper inner section 87 and a lower inner section 88. The upper inner section 87 has a diameter that is smaller than that of the lower inner section 88. The diameter of upper inner section 87 is larger than the diameter of the annular axle section 56 of retention section 55 and smaller than the diameter of the annular section 57. The diameter of lower inner section 88 is greater than the diameter of the annular section 57. The annular axle section 56 of retention section 55 and upper inner section 87 are configured to permit the inner valve member 35 to rotate relative to the outer valve member 65.

The annular section 57 and the slots 59 in the annular axle section 56 are configured to permit the annular section 57 and the arms 61 to pass through the upper inner section 87 during assembly of the valve assembly 30 and spring back with the annular section 57 positioned within the lower inner section 88.

A plurality of support webs or gussets 69 may extend along the lower surface of discharge section 70 between the alignment ring 80 and the inner annular ring 85.

Figure 12:
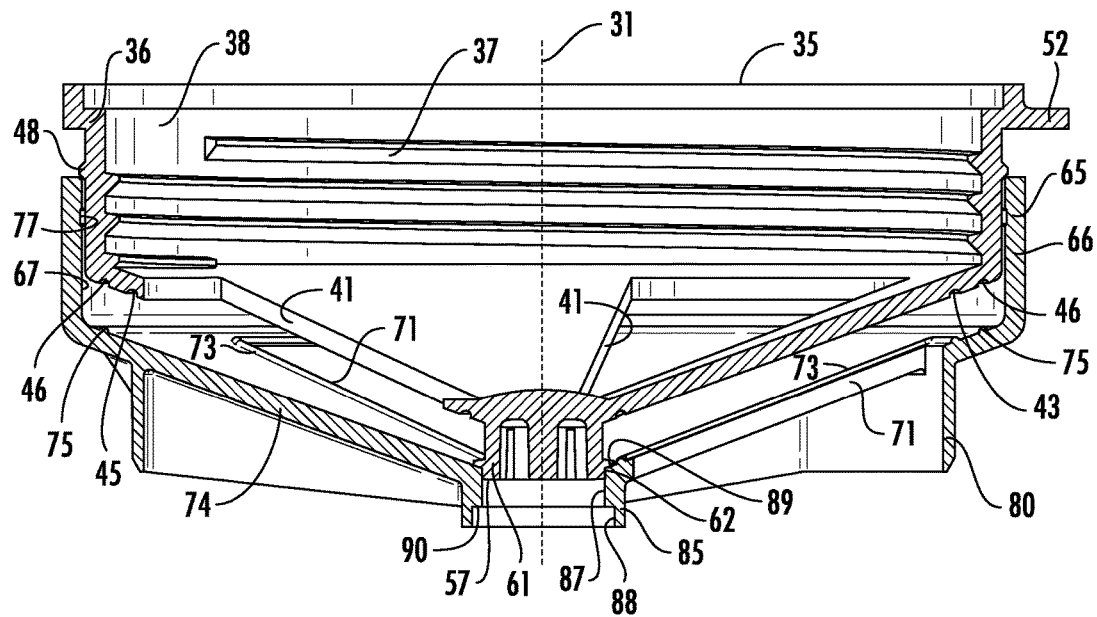
FIG. 12 is a sectional view of the valve assembly with the inner valve member partially inserted into the outer valve member.

To assemble valve assembly 30, inner valve member 35 and outer valve member 65 are aligned along a central axis 31 as depicted in FIG. 12. Inner valve member 35 is then moved relatively towards the outer valve member 65. In doing so, the discharge section 40 of inner valve member 35 passes through the annular body section 66 of outer valve member 65. As the inner valve member 35 continues to be moved towards the outer valve member 65, the annular body section 36 of the inner valve member enters annular body section 66 of the outer valve member with the outer surface 39 of the annular body section 36 being adjacent the inner surface 67 of the annular body section 66 (FIG. 13).

Continued relative movement results in the tapered lower surface 62 of the annular section 57 engaging the upper edge 89 of the inner annular ring 85. Further movement between the inner valve member 35 and the outer valve member 65 results in deflection of the flexible arms 61 so that the annular section 57 passes through the upper inner section 87. Once the annular section 57 reaches the lower inner section 88, the flexible arms 61 spring back to their undeflected positions with the locking shoulder 58 of the retention section 55 engaging the locking surface 90 defined by lower surface of the upper inner section 87.

As the inner valve member 35 and the outer valve member 65 are moved to their fully assembled positions depicted in FIG. 13, the sealing projection 75 along the upper surface 74 of lower surface 70 of the upper valve member engages the annular channel 46 in the lower surface 44 of discharge section 40 of the inner valve member. In addition, the annular upper seal projection 48 of the annular body section 36 of inner valve member 35 engages the annular upper seal channel 77 in the inner surface 67 of the body section 66. The inner valve member 35 may be rotated relative to the outer valve member 65 to the closed position so that each projection 73 extending upward from the upper surface 74 of the discharge section 70 and surrounding an opening 71 is aligned with one of the sealing channels 43 in the lower surface 44 of discharge section 40 of inner valve member 35 to seal the openings 71 and prevent material within the container 21 from passing through the valve assembly 30.

Although depicted with channels 43 extending into the inner valve member 35 and projections 73 extending from the outer valve member 65, annular recess 46 extending into the inner valve member 35 and annular sealing projection 75 extending from the outer valve member 65, and upper seal projection 48 extending from the inner valve member 35 and annular channel 77 extending into the outer valve member 65, the location of the structures forming each seal may be reversed, if desired. In some instances, it may be desirable for the projections 73 to extend upward from the outer valve member 65 to reduce the likelihood that material from package 21 will fill their complimentary recesses.

Figure 3:
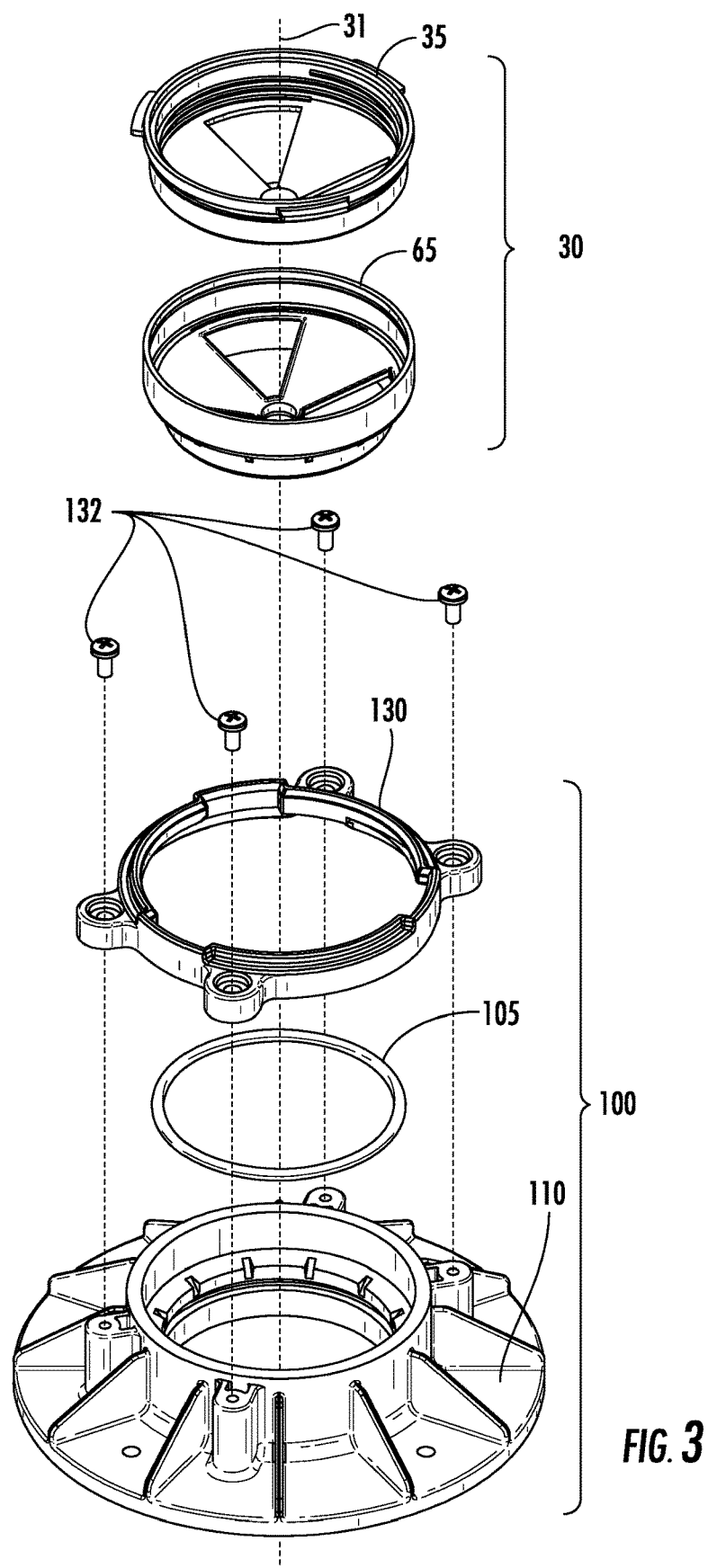
FIG. 3 is an exploded perspective view of a valve assembly and a base of FIG. 1.
Figure 4:
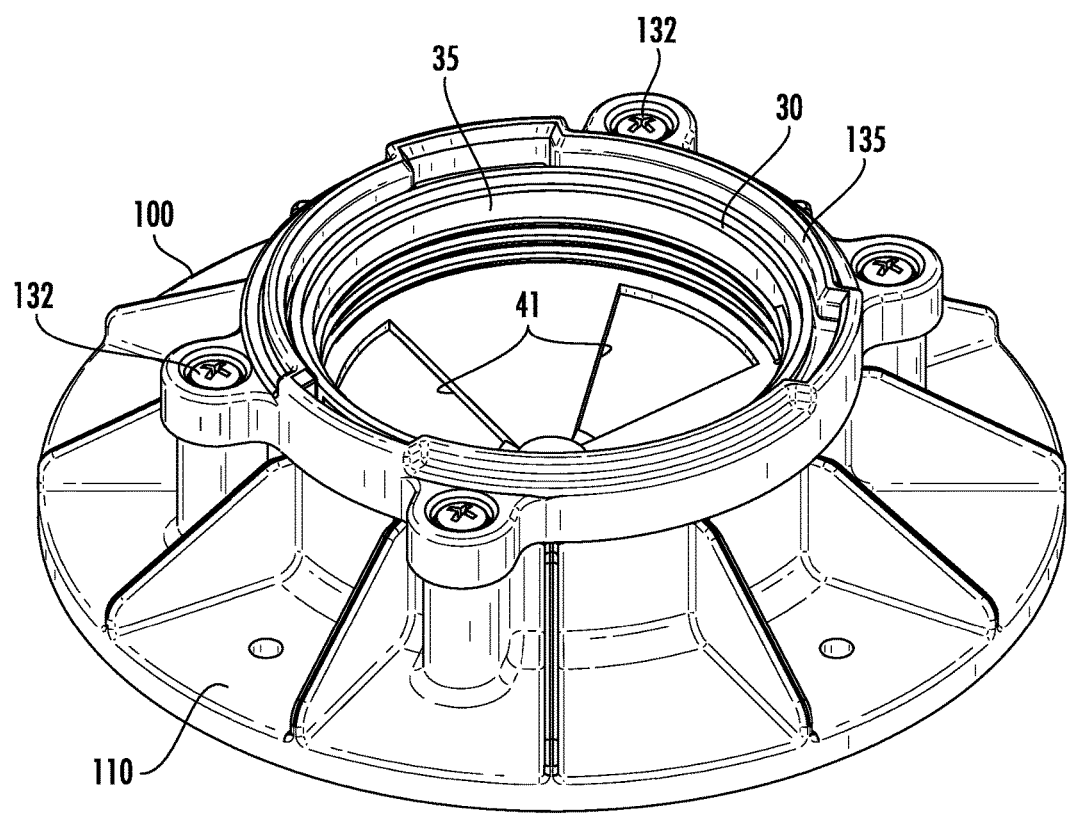
FIG. 4 is a perspective view of the valve assembly inserted into the base.
Figure 5:
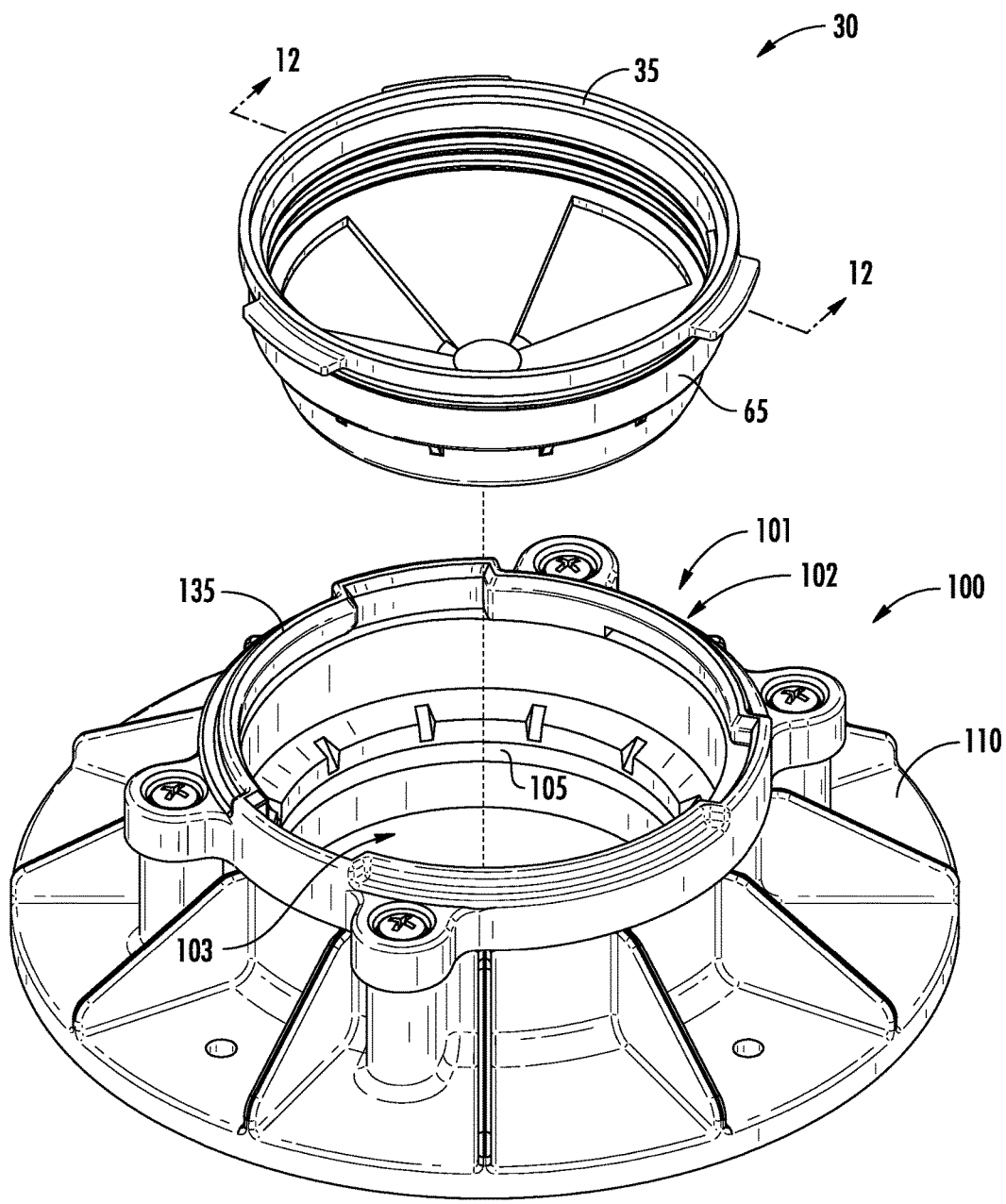
FIG. 5 is a perspective view of the valve assembly and base of FIG. 1 prior to insertion of the valve assembly into the base.

Base 100 includes a central receptacle 101 (FIG. 5) having an inlet 102 and an outlet 103. The inlet 102 is configured to receive at least a portion of valve assembly 30 therein. The outlet 103 is configured to pass or discharge material therethrough. As depicted in FIG. 3, base 100 includes an annular lower base member 110 together with an annular upper base component or locking ring 130 mounted on the upper annular surface 125 of the base member.

Figure 14:
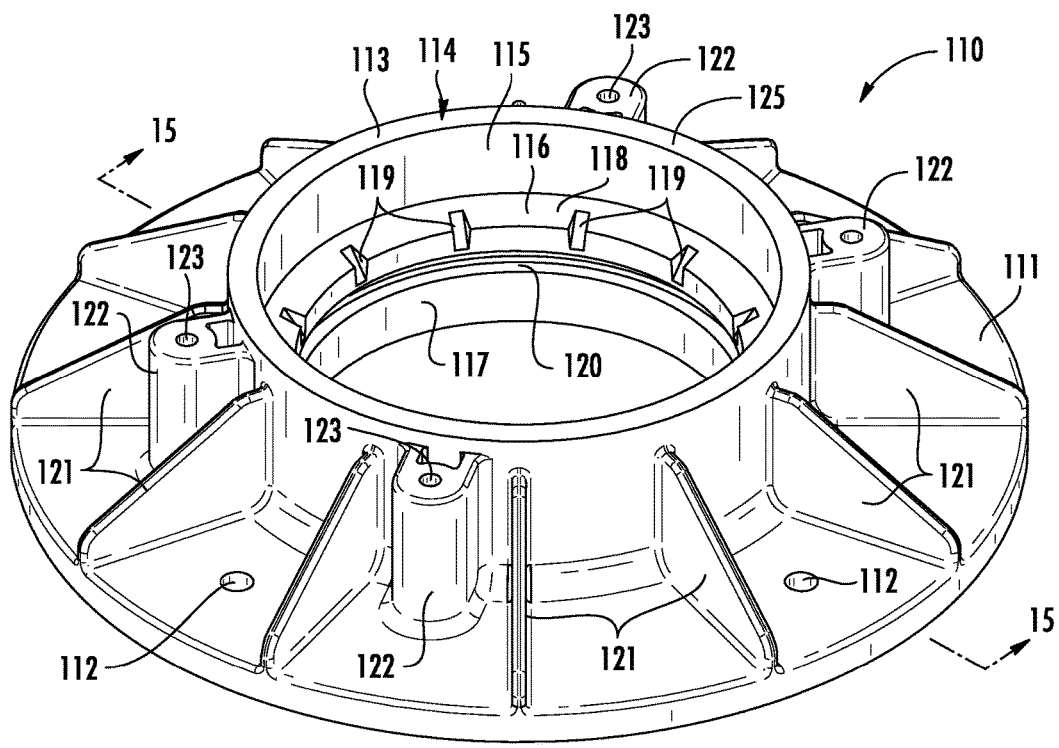
FIG. 14 is a perspective view of a base member of the base.
Figure 15:
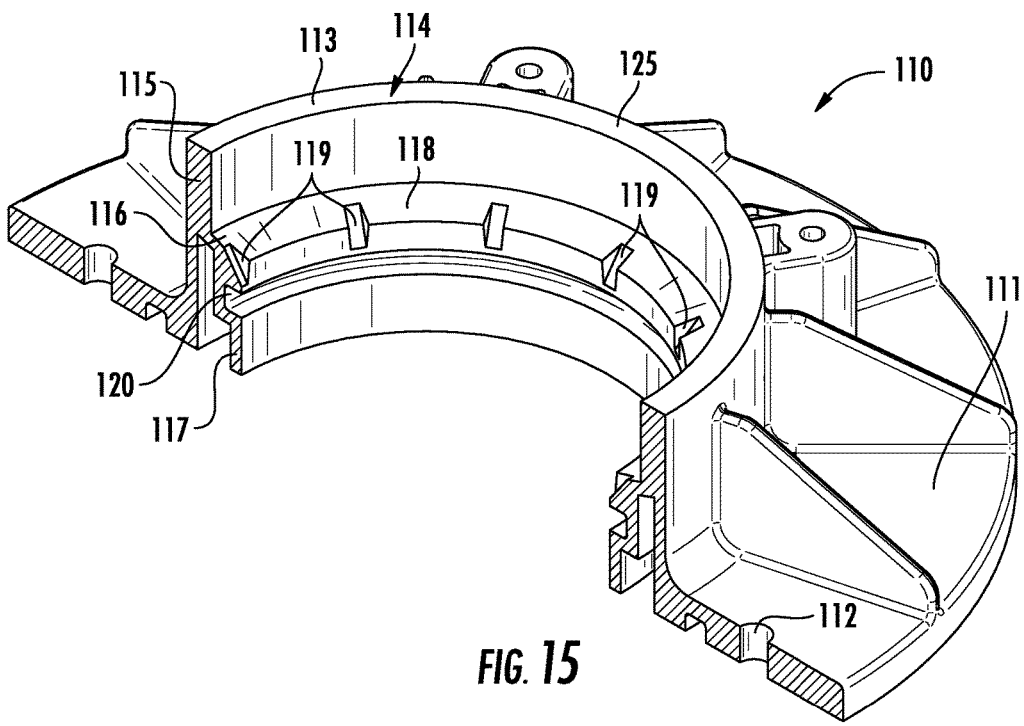
FIG. 15 is a sectional view taken generally along line 15-15 in FIG. 14.
Figure 16:
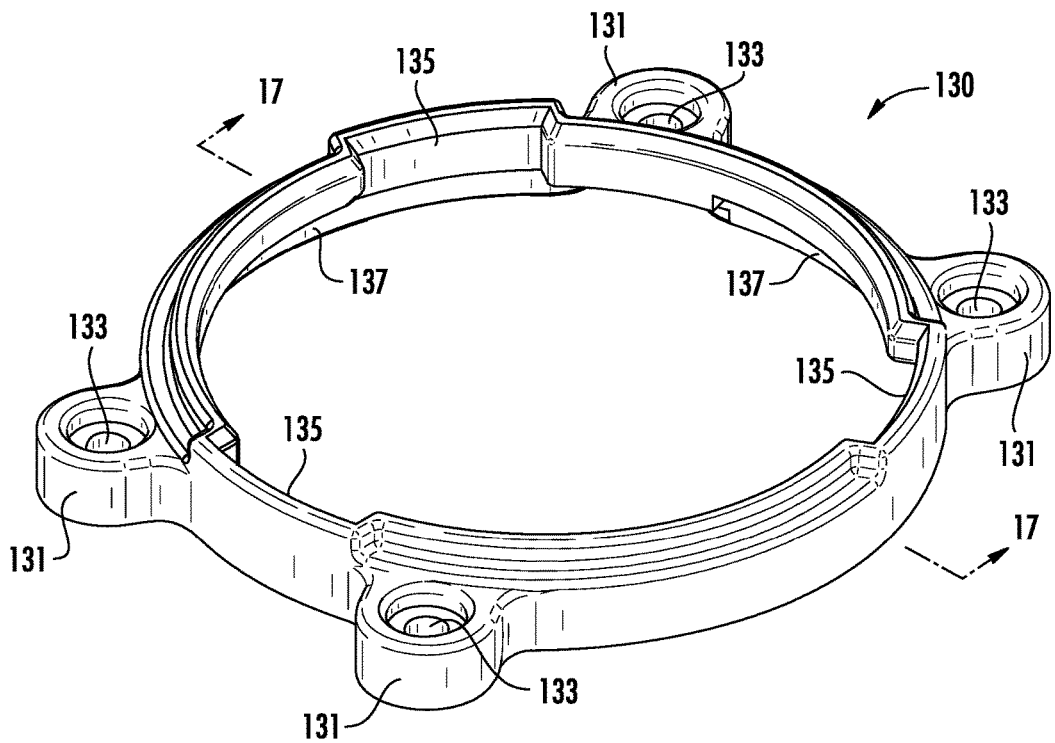
FIG. 16 is a perspective view of the locking ring of the base.
Figure 17:
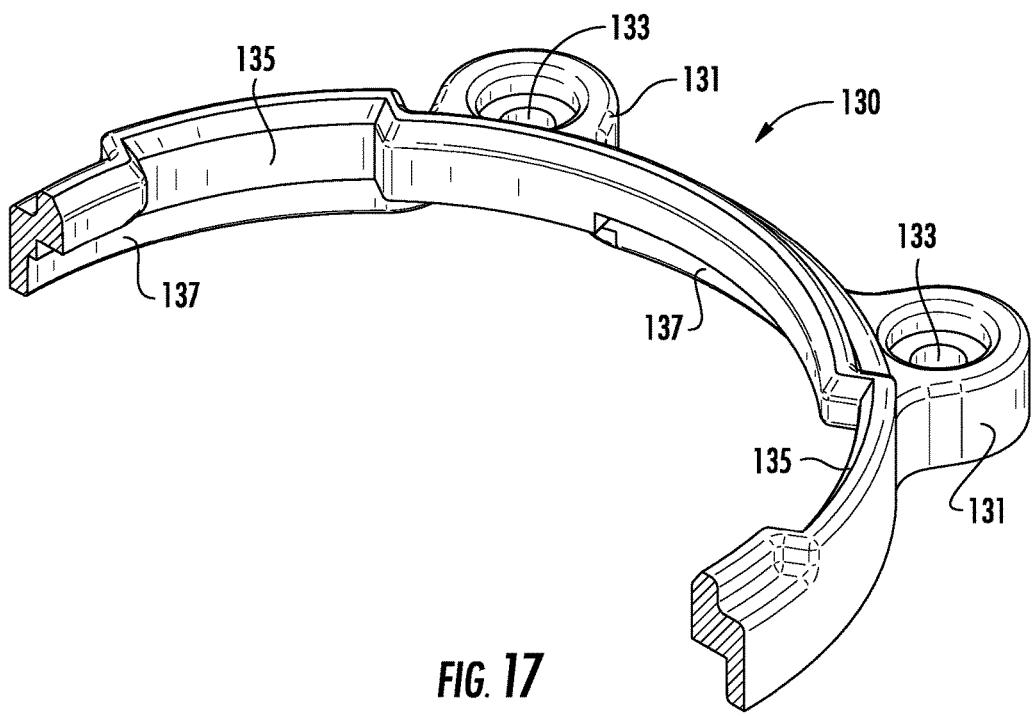
FIG. 17 is a sectional view taken generally along line 17-17 in FIG. 16.

Referring to FIGS. 14-15, the base member 110 includes a generally annular flange 111 configured for mounting to or on feed mechanism 22. The flange 111 may include a plurality of bores 112 through which fasteners such as bolts (not shown) may extend. The flange 111 may also include an annular groove (not shown) in a lower or mounting surface to receive an O-ring therein to assist in sealing the flange 111 to the feed mechanism 22.

The base member 110 includes a central annular cylindrical section 113 having a stepped circular bore 114 through which material may pass or be discharged. The stepped bore 114 has an upper section 115, an angled central support section 116, and a lower section 117. The upper section 115 has a circular diameter and is dimensioned to receive in close proximity the annular body section 66 of outer valve member 65. The angled central support section 116 has an upper support surface 118 that is tapered or angled downward towards the center of bore 114 and is configured to engage and support the angled mounting surface 81 of outer valve member 65. The lower section 117 has a circular diameter smaller than that of upper section 115 and is dimensioned to receive in close proximity the alignment ring 80 of outer valve member 65.

A plurality of engagement slots or recesses 119 extend downward into the angled upper support surface 118 and through the central support section 116 and into an upper portion of the lower section 117. The engagement slots 119 are configured to receive the engagement tabs 82 of outer valve member 65 therein upon inserting the valve assembly 30 into the stepped bore 114 to form an engagement structure. The engagement structure (i.e., interaction between the engagement tabs 82 and the engagement slots 119) prevents the outer valve member 65 from rotating relative to the base member 110. The lower section 117 may also include an annular groove 120 (FIG. 14) for receiving an O-ring 105 therein to assist in optimizing the seal between the alignment ring 80 and the lower section 117.

A plurality of support ribs 121 may extend between the flange 111 and the central section 113 to provide additional rigidity to the base member 110. A plurality of mounting supports 122 may extend upward from the flange 111 and laterally or radially from the central tube 113. The mounting bosses 122 may include a threaded bore 123.

Locking ring 130 is generally annular and includes a plurality of mounting bosses 131 extending laterally or radially outward and that are configured to be aligned with the mounting supports 122 of base member 110. Fasteners such as screws 132 (FIG. 3) may pass through bores 133 in the mounting bosses 131 and be secured to the mounting supports 122 to secure the locking ring 130 to the base member 110.

Locking ring 130 has three spaced apart annular alignment slots 135. The lower portion 136 of each alignment slot 135 is positioned adjacent the upper surface 125 of the base member 110 when the locking ring 130 is mounted on the base member. An elongated circumferential channel 137 extends circumferentially from the lower portion 136 of each alignment slot 135. Each of the elongated circumferential channels 137 extends in the same direction relative to its respective alignment slot 135. The lower portion 138 of each circumferential channel 137 is positioned against the upper surface 125 of the base member 110 when the locking ring 130 is mounted on the base member.

The direction that the circumferential channels 137 extend from the alignment slots 135 defines the "opening" direction of the material supply system 20. More specifically, rotation of the inner valve member 35 relative to the outer valve member 65 in the opening direction causes the operating tabs 52 to rotate from their respective alignment slots 135 and into their respective circumferential channels 137. Such movement causes the inner valve member 35 to move from a closed position to an open position and thus opens the valve assembly 30.

The alignment slots 135 are configured to sliding receive the operating tabs 52 therein as the valve assembly 30 is inserted into the base 100. The circumferential channels 137 are configured to rotatingly receive the operating tabs 52 therein after the valve assembly 30 is fully inserted into the base member 110 and the inner valve member 35 is rotated relative to the outer valve member 65.

To assemble base 100, base member 110 and locking ring 130 are aligned along a central axis 31 as depicted in FIG. 3. Locking ring 130 is moved relatively towards the base member 110 until a lower surface of the locking ring engages the upper surface 125 of the base member 110. The locking ring 130 is rotated relative to the base member 110 so that the mounting bosses 131 are aligned with the mounting supports 122 of the base member. The locking ring 130 may be rotated into alignment during the process of aligning the locking ring with the base member along central axis 31, while the locking ring is being moved relatively towards the base member 110, and/or once the locking ring is positioned on the mounting base member. Fasteners such as screws 132 may be inserted through the mounting bosses 131 and secured to the mounting supports 122 to secure the locking ring 130 to the base member 110.

Each of the components of the valve assembly 30 and the base 100 may be formed from any desired material. In one example, some or all of the components may be made of high density polyethylene, polypropylene, or any other material.

To utilize the valve assembly 30 and base 100 within a closed loop material feed system, the base 100 is mounted on and secured to any desired structure such as a feed mechanism 22. Fasteners (not shown) may be inserted through bores 112 in the flange 111 of the base member 110 to secure the base 100 to the feed mechanism 22.

Valve assembly 30, in a closed condition, is secured to the tapered discharge section 24 of container 21 in any desired manner. In one embodiment, the tapered discharge section 24 of container 21 may include a plurality of threads (not shown) and the valve assembly 30 is secured to the tapered discharge section by rotating the valve assembly 30 relative to the container 21 so that the threads 27 of the valve assembly engage the threads of the tapered discharge section.

To mount the container 21 and valve assembly 30 on the base 100, the container and valve assembly are positioned above the base 100 along central axis 31. The valve assembly 30 is moved relatively towards the base 100 and rotated so that the operating tabs 52 of the inner valve member 35 are aligned with the alignment slots 135 of the locking ring 130. The valve assembly 30 is further moved towards the base 100 so that the operating tabs 52 are fully inserted into the alignment slots 135 and are generally positioned adjacent the lower portion 136 of each alignment slot.

In such position, each operating tab 52 is aligned with one of the circumferential channels 137. In addition, the annular body section 66 of outer valve member 65 is positioned within the upper section 115 of stepped bore 114 of base member 110 and the annular alignment ring 80 of the outer valve member is positioned within the lower section 117 of the stepped bore of the mounting base member. The angled mounting surface 81 of the outer valve member 65 engages the upper support surface 118 of angled central support section 116 of the stepped bore 114 of base member 110 with each of the engagement tabs 82 positioned in one of the engagement slots 119 in the tapered central section. Interaction between the engagement tabs 82 and the engagement slots 119 prevents relative rotational movement between the outer valve member 65 and base member 110. With the valve assembly 30 in its closed position, no material passes from the container 21 through the valve assembly and base 100, and into the feed mechanism 22.

Rotation of the container 21 in the opening direction transfers a rotational force to the inner valve member 35. Upon the rotational force exceeding a threshold, the container 21 and inner valve member 35 will rotate relative to the outer valve member 65 and base member 110. During such rotation, the operating tabs 52 will rotate within the circumferential channels 137 and the sealing channels 43 in the lower surface 44 of discharge section 40 of inner valve member 35 will rotate away from their respective projections 73 surrounding each opening 71 in the outer valve member 65. The container 21 may continue to be rotated until the operating tabs 52 reached the end of the circumferential channels 137. In instances in which locking channels 45 are provided that encircled the openings 41 in the discharge section 40 of the inner valve member 35, the projection 73 surrounding each opening 71 may engage the locking channels to hold or retain the container 21 and inner valve member 35 in an open position while the material is discharged from the container.

Since the operating tabs 52 are positioned within the circumferential channels 137 while the valve assembly 30 is open, the container 21 and valve assembly 30 may not be removed from the base 100 while the valve assembly is in its open position. In other words, while the valve assembly 30 is in its open position, operating tabs 52 are not aligned with alignment slots 135 so that the circumferential channels 137 prevent the removal of the valve assembly 30 from the base 100.

To remove the container 21 and valve assembly 30 from the base 100, the container and inner valve member 35 are rotated back to their closed position (i.e., the valve assembly is in its closed position) so that the operating tabs 52 are aligned with the alignment slots 135 in the locking ring 130. The valve assembly 30 may then be removed from the base 100 by vertical movement of the valve assembly relative to the base.

FIGS. 18-23 depict an alternate embodiment of a fitment or valve assembly 230 and docking station or base 300. The valve assembly 230 and base 300 may be generally similar or identical to valve assembly 30 and base 100 described above and therefore descriptions of the valve assembly and base are not repeated herein.

FIGS. 18-21 depict an alternate embodiment of a fitment or valve assembly 230 and docking station or base assembly 300. Certain aspects of the valve assembly 230 and base assembly 300 may be generally similar or identical to valve assembly 30 and base 100, respectively, described above and therefore aspects of the descriptions of the valve assembly and base assembly may not be repeated herein.

Figure 22:
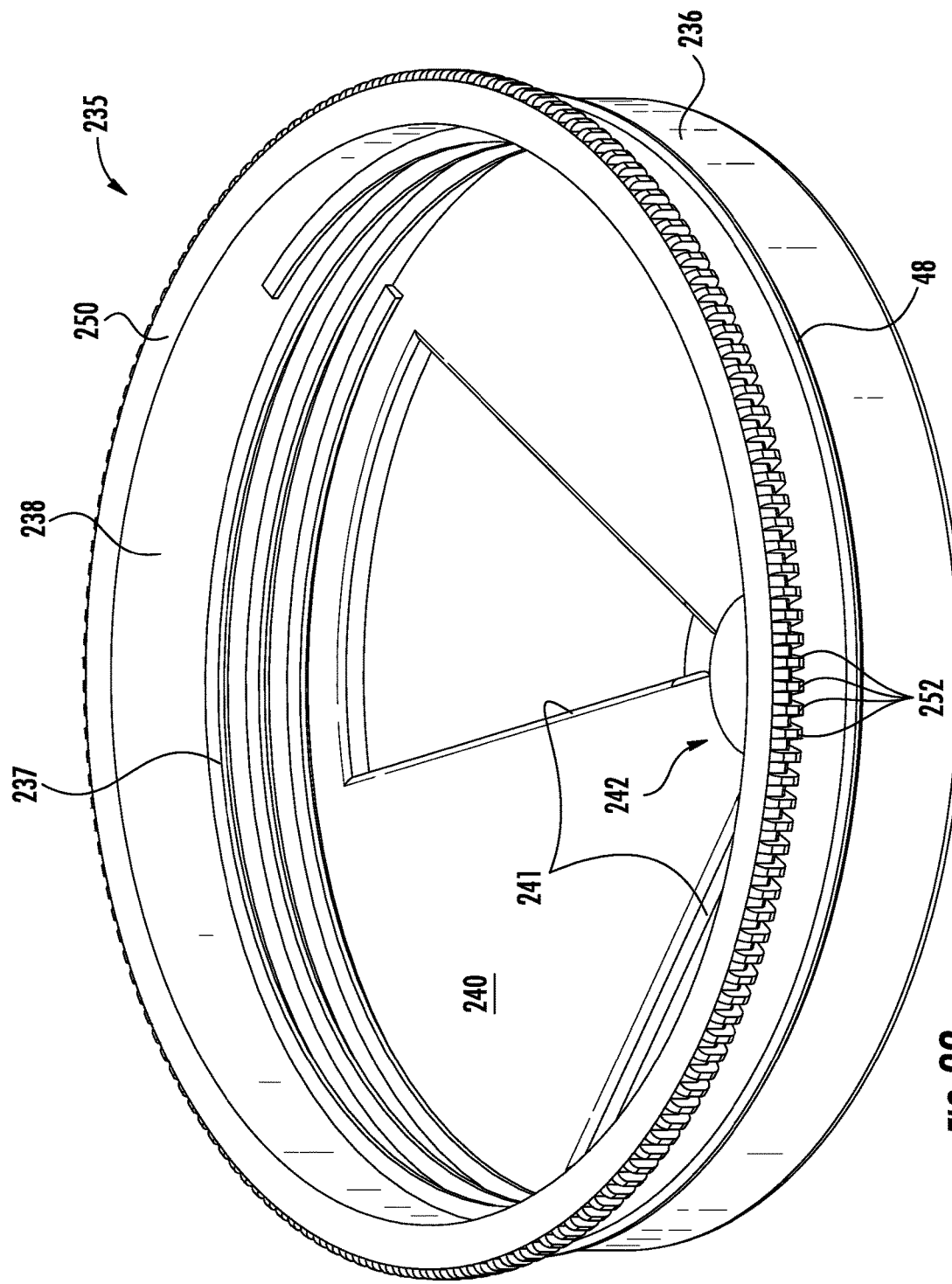
FIG. 22 is a perspective view of an inner valve member of the valve assembly of FIG. 21.
Figure 23:
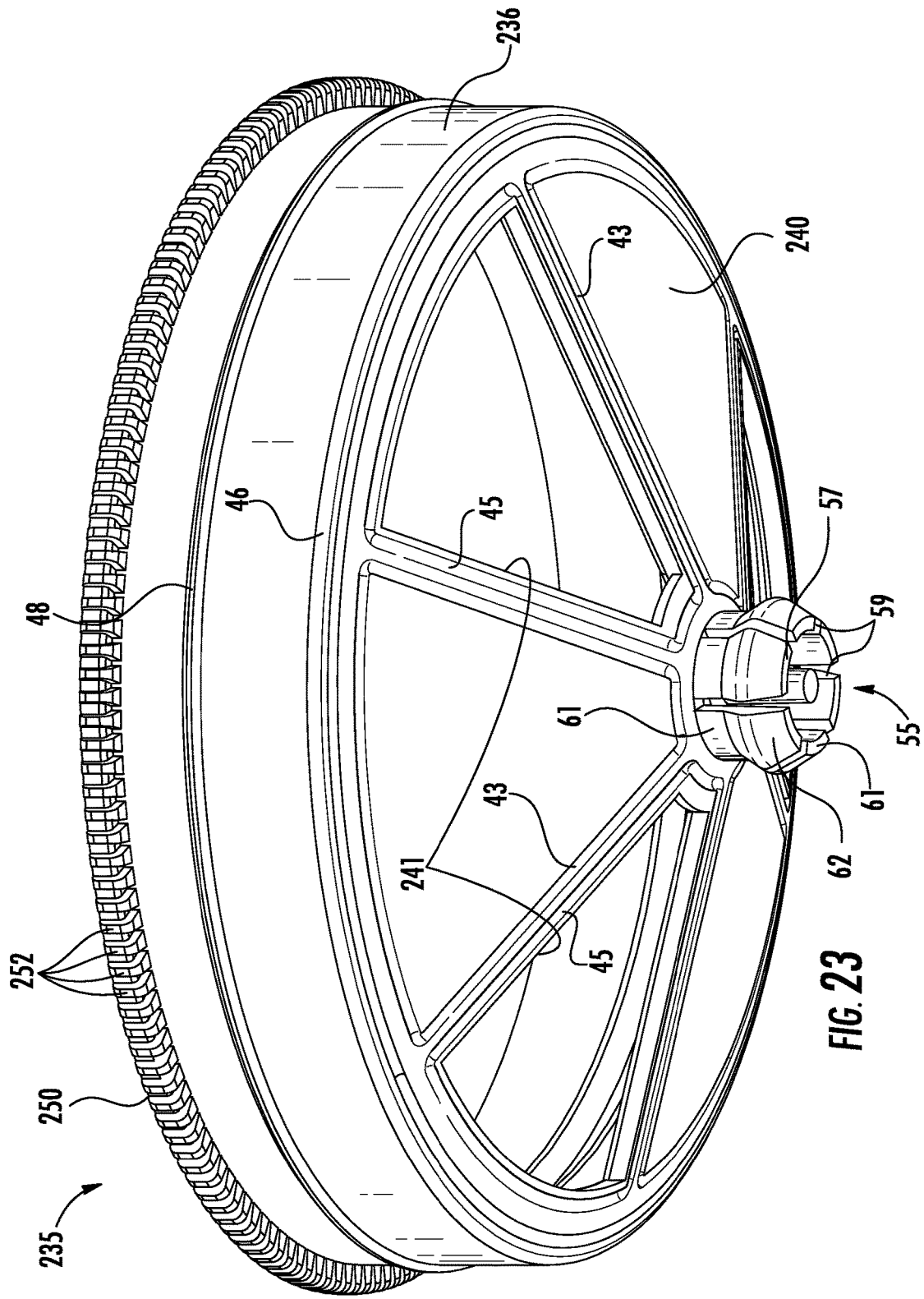
FIG. 23 is a perspective view of the inner valve member of FIG. 22 but taken from a perspective below the inner valve member.

Valve assembly 230 may be similar to valve assembly 30 and includes an inner valve member 235 that is rotatably mounted on and partially within outer valve member 265. Referring to FIGS. 22-23, the inner valve member 235 may be similar to inner valve member 35 and certain aspects are not repeated herein. Inner valve member 235 has an annular body section 236 with a tapered lower discharge section 240. The annular body section 236 may include threads 237 on an inner surface 238 thereof configured to sealingly engage the threads on the mounting section 26 of container 21 as described above with respect to valve member 35.

The discharge section 240 includes a plurality of openings 241 that extend generally from the body section 236 to the center section 242 of the inner valve member 235. As with inner valve member 35, the lower discharge section 240 may include any number and configuration of openings provided that they permit the desired flow rate from the container 21 through the valve assembly 230.

The upper portion of annular body section 236 may be configured as an enlarged annular portion 250 having an outer diameter greater than that of outer surface 239 of the main portion of the annular body section. The outer surface of the annular portion 250 is configured with a plurality of spaced apart, laterally or radially outwardly extending projections or teeth 252. If desired, the teeth 252 may also extend to some extent downward.

Figure 20:
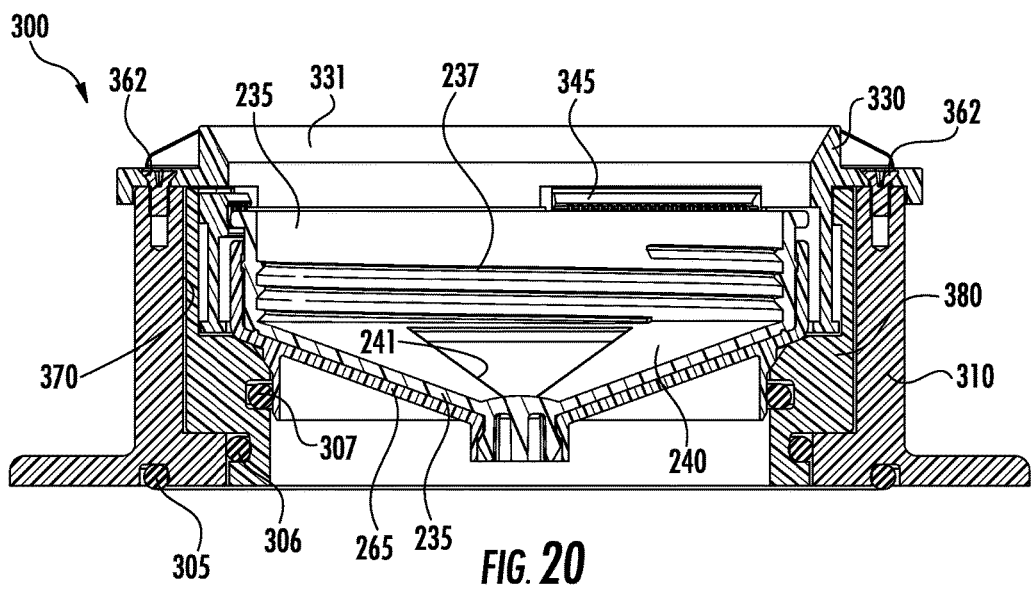
FIG. 20 is a sectional view taken generally along line 20-20 of FIG. 19.
Figure 24:
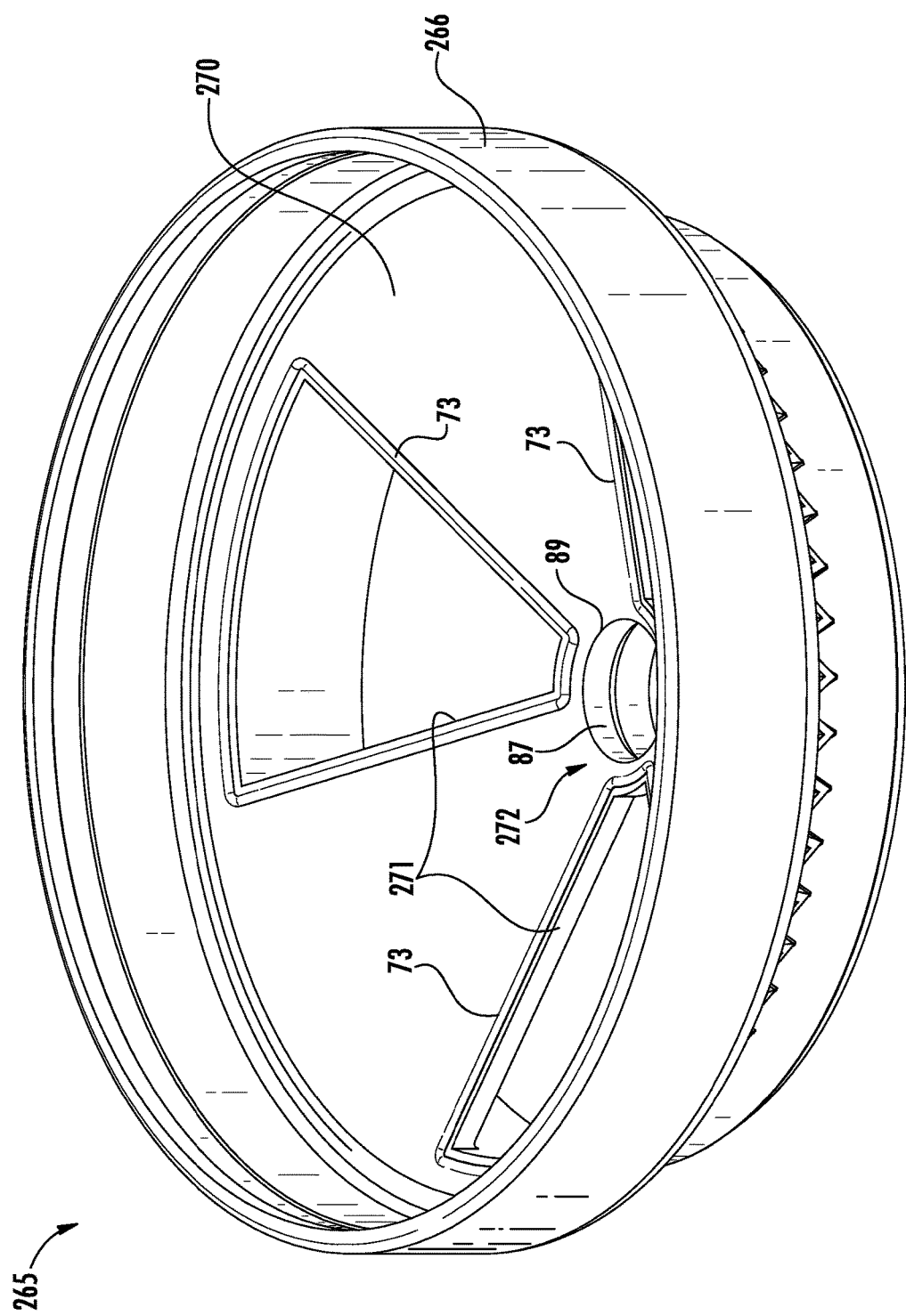
FIG. 24 is a perspective view of an outer valve member of the valve assembly of FIG. 21.
Figure 25:
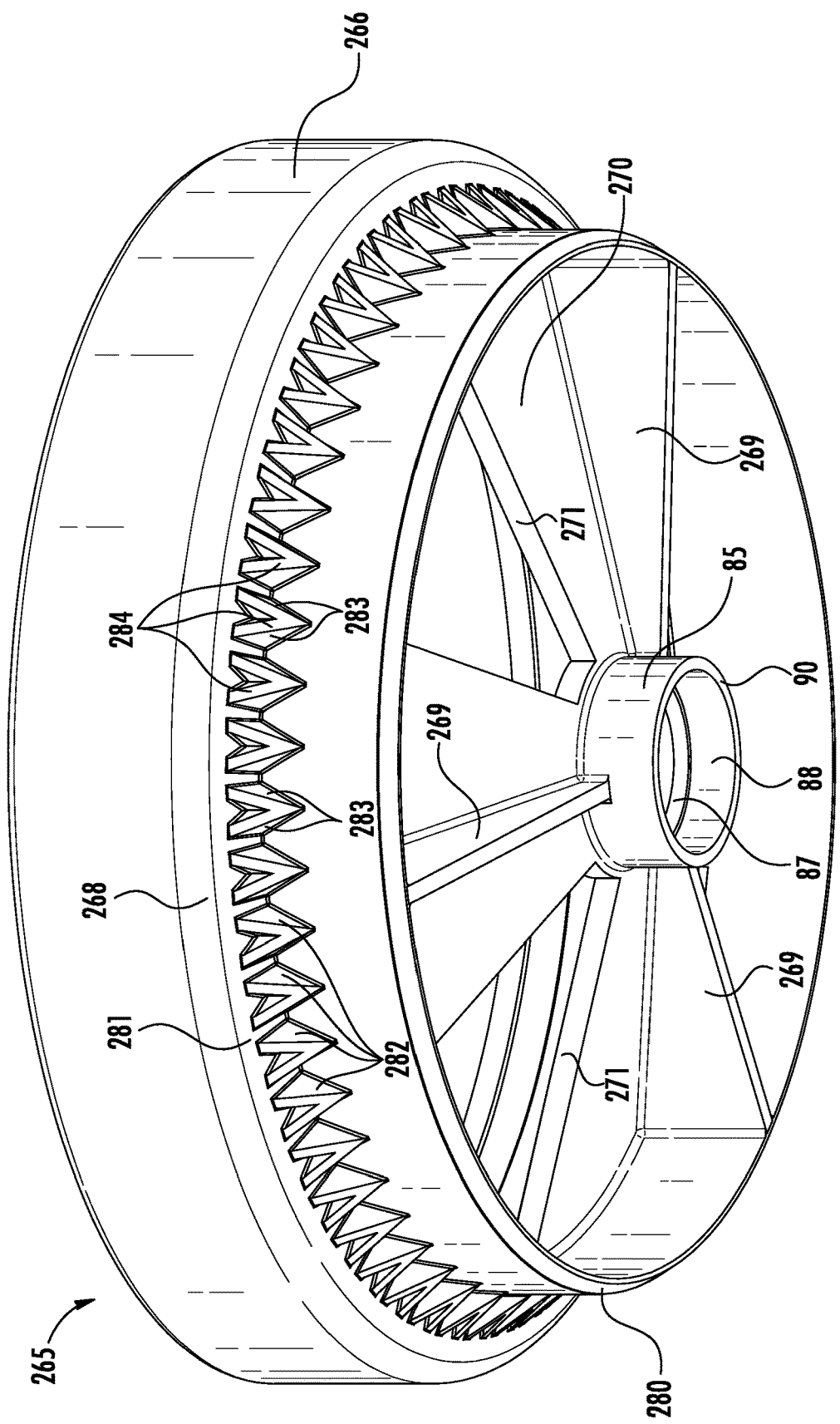
FIG. 25 is a perspective view of the outer valve member of FIG. 24 but taken from a perspective below the outer valve member.

Referring to FIGS. 24-25, the outer valve member 265 is configured to receive the inner valve member 235 therein. Outer valve member 265 may be similar to outer valve member 65 and certain aspects are not repeated herein. Outer valve member 265 has an annular body section 266 with a tapered lower discharge section 270. The annular body section 266 is dimensioned to receive the annular body section 236 of inner valve member 235 in a closely spaced relationship and the discharge section 270 is dimensioned to receive the discharge section 240 of the inner valve member 235 in a closely spaced relationship (FIG. 20).

The discharge section 270 includes a plurality of openings 271 that extend generally from the body section 266 to the center section 272 of the outer valve member 265. The openings 271 may be identical in number and in size to the openings 241 in the inner valve member 235. Accordingly, as depicted, the discharge section 270 includes three generally triangularly-shaped openings 271.

The lower portion of the outer valve member 265 includes an outer annular alignment ring 280 extending downwardly from the discharge section 270 that is centered about center section 272. A portion of the lower surface of discharge section 270 forms a lower angled or tapered mounting surface 281 that extends from a lower edge 268 of the body section 266 to the alignment ring 280. Although depicted with an angled surface that angles downward towards the center of the outer valve member 265, in another embodiment, the alignment surface 281 may be generally horizontal rather than angled downward towards the alignment ring 280.

A plurality of downwardly projecting tapered engagement tabs or projections 282 extend between the body section 266 and the alignment ring 280 from the lower angled mounting surface 281. Each projection 282 is configured as a triangular pyramid with tapered side surfaces 283, an outer surface 284, and a surface that extends along the alignment surface 280. The projections 282 are equally spaced apart with a generally identically shaped recess 285 between each engagement tab.

The sealing components of the valve assembly 230 operative to create a seal between the inner valve member 235 and the outer valve member 265 may be substantially identical to those of valve assembly 30, are identified with the same references numbers, and the description thereof is not repeated herein. In addition, components for locking the inner valve member 235 and the outer valve member 265 may also be substantially identical to those of valve assembly 30, are identified with the same references numbers, and the description thereof is not repeated herein.

The retention components between inner valve member 235 and outer valve member 265 may be substantially identical to those of valve assembly 30, are identified with the same references numbers, and the description thereof is not repeated herein. A plurality of support webs or gussets 269 may extend along the lower surface of discharge section 270 between the alignment ring 280 and the inner annular ring 85.

Figure 18:
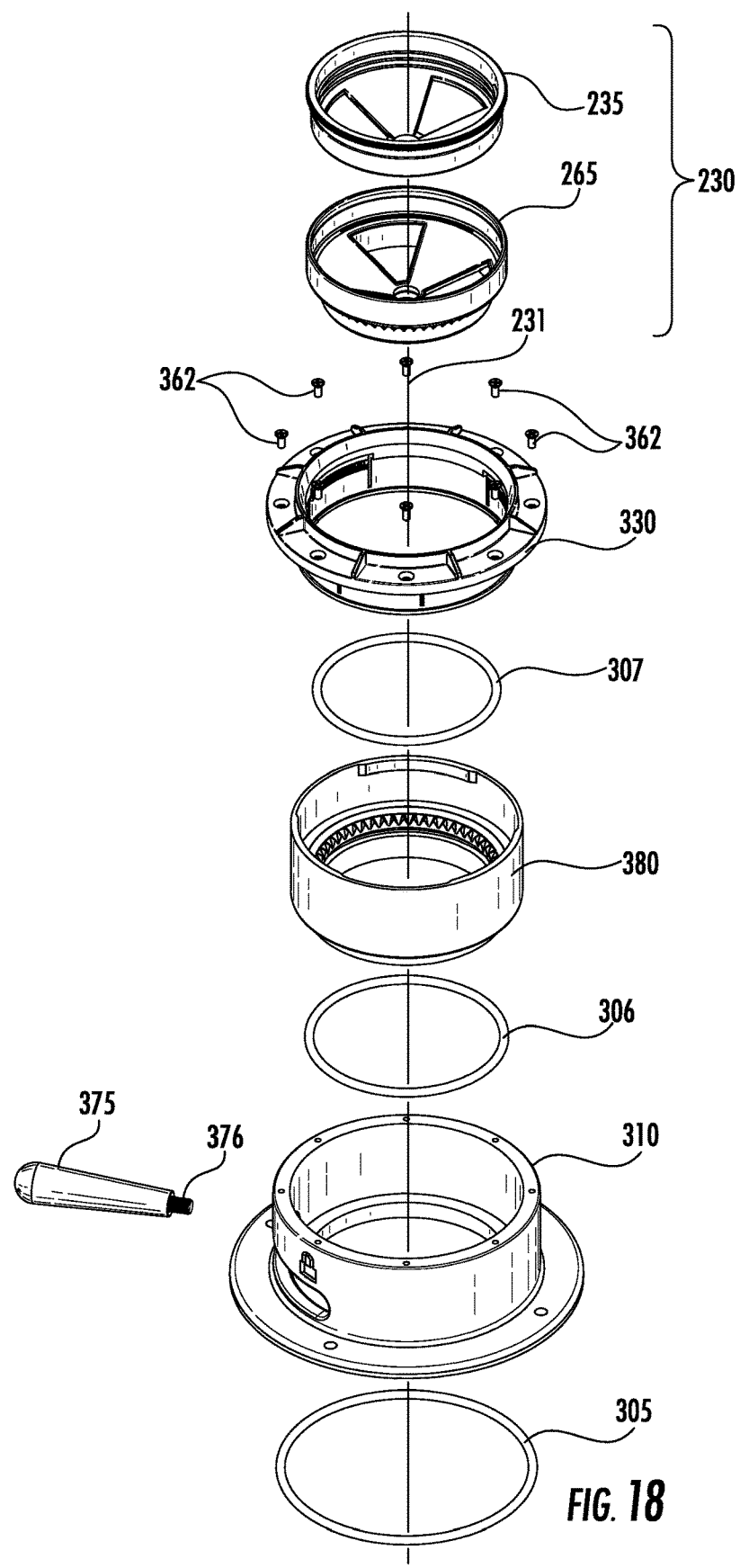
FIG. 18 is an exploded perspective view of a second embodiment of a valve assembly and a base assembly.
Figure 19:
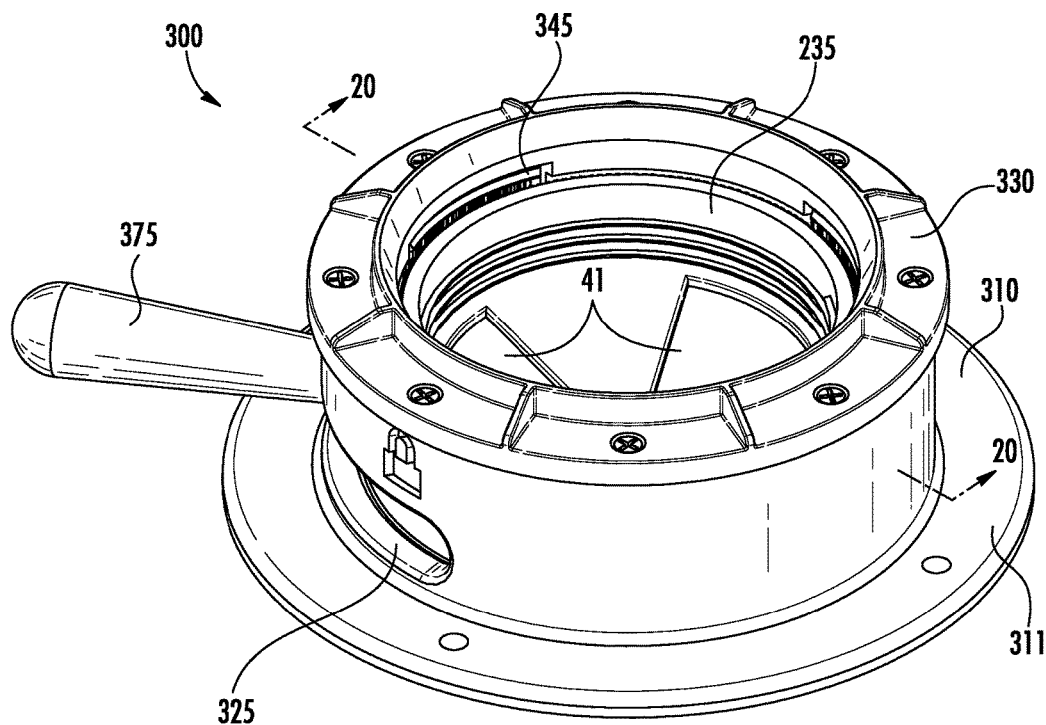
FIG. 19 is a perspective view of the valve assembly inserted into the base assembly of FIG. 18.

To assemble valve assembly 230, inner valve member 235 and outer valve member 265 are aligned along a central axis 231 as depicted in FIG. 18. Inner valve member 235 is then moved relatively towards the outer valve member 265 as described above with respect to valve assembly 30 and the description thereof is not repeated.

Base assembly 300 includes a central receptacle 301 (FIG. 21) having an inlet 302 and an outlet 303. The inlet 302 is configured to receive at least a portion of valve assembly 230 therein. The outlet 303 is configured to pass or discharge material therethrough. As depicted in FIG. 18, base assembly 300 includes an annular lower base component or member 310 with an annular upper base component or locking member 330 mounted on the upper annular surface 325 of the base member and an annular actuator 380 rotatably mounted within the lower base member 310.

Figure 26:
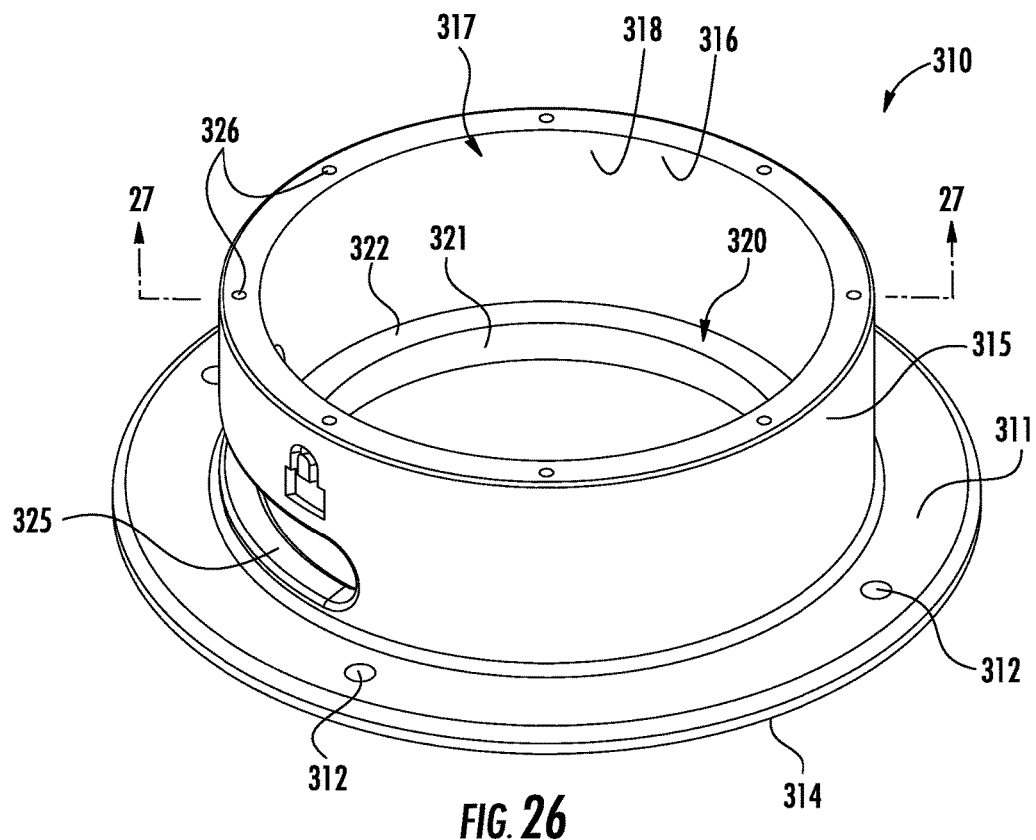
FIG. 26 is a perspective view of a base member of the base assembly of FIG. 19.
Figure 27:
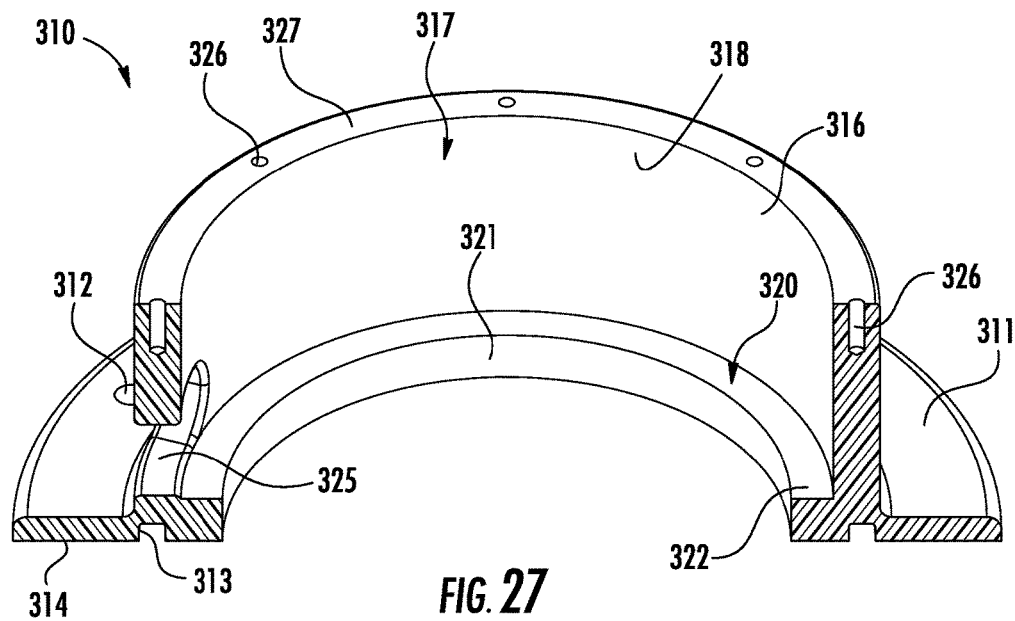
FIG. 27 is a sectional view taken generally along line 27-27 in FIG. 26.

Referring to FIGS. 26-27, the base member 310 includes a generally annular flange 311 configured for mounting to or on feed mechanism 22. The flange 311 may include a plurality of bores 312 through which fasteners such as bolts (not shown) may extend. The flange 311 may also include an annular groove 313 in a lower or mounting surface 314 to receive an O-ring 305 therein to assist in sealing the flange 311 to the feed mechanism 22.

Base member 310 includes a central annular cylindrical section 315 having a stepped circular bore 316. The stepped bore 316 has an upper section 317 and a lower section 320. The upper section 317 has a circular upper diameter defined by inner surface 318 and the lower section 320 has a circular lower diameter smaller than that of upper section 317 and is defined by inner surface 321. The smaller diameter of the lower section 320 defines an upper surface or ledge 322. Base member 310 further includes a horizontal, semi-annular or circumferentially extending arcuate slot 325 extending horizontally along a portion of the upper section 317. A plurality of threaded mounting bores 326 extend into the upper surface 327 of base member 310.

Figure 28:
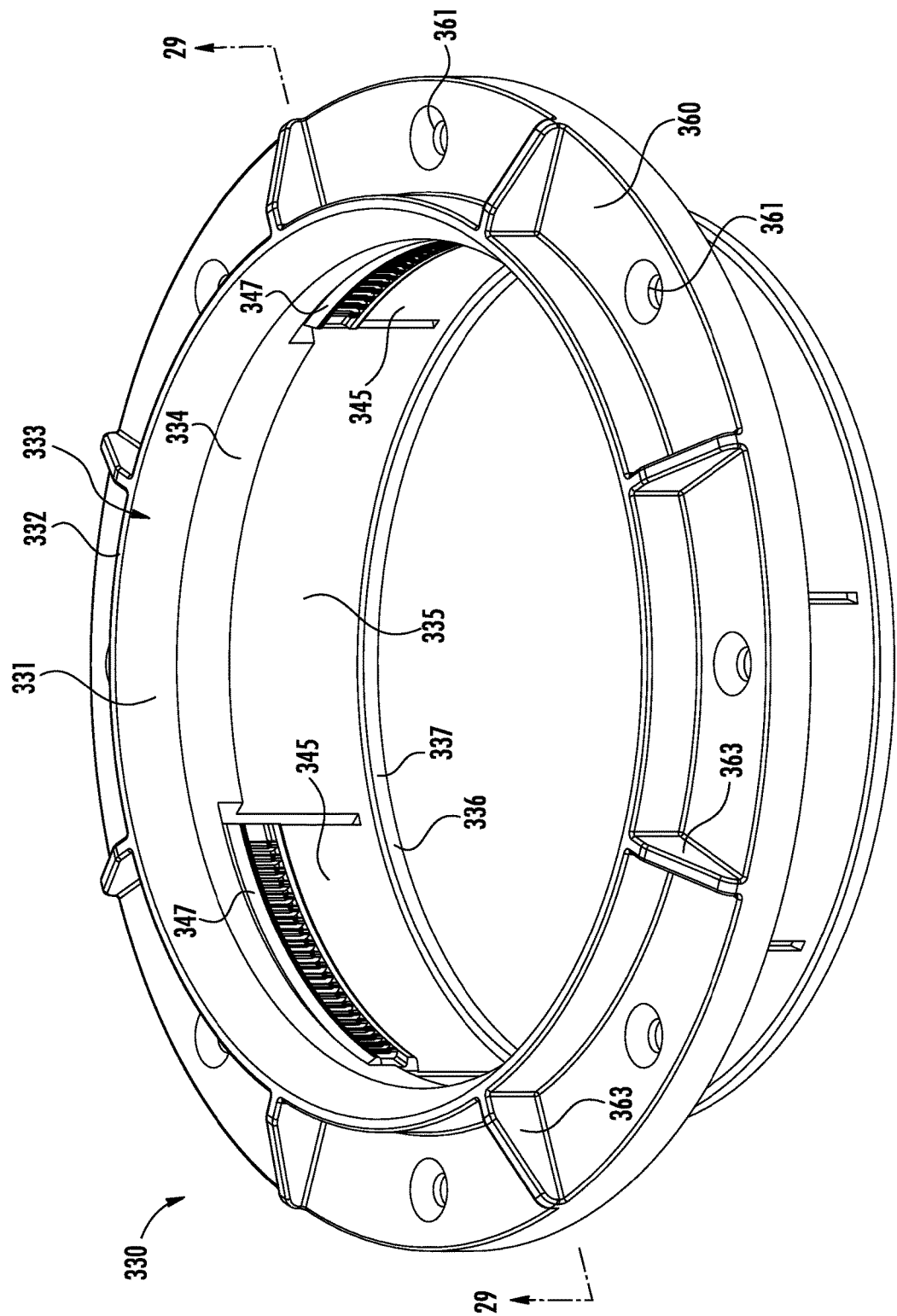
FIG. 28 is a perspective view of the locking member of the base assembly of FIG. 19.
Figure 29:
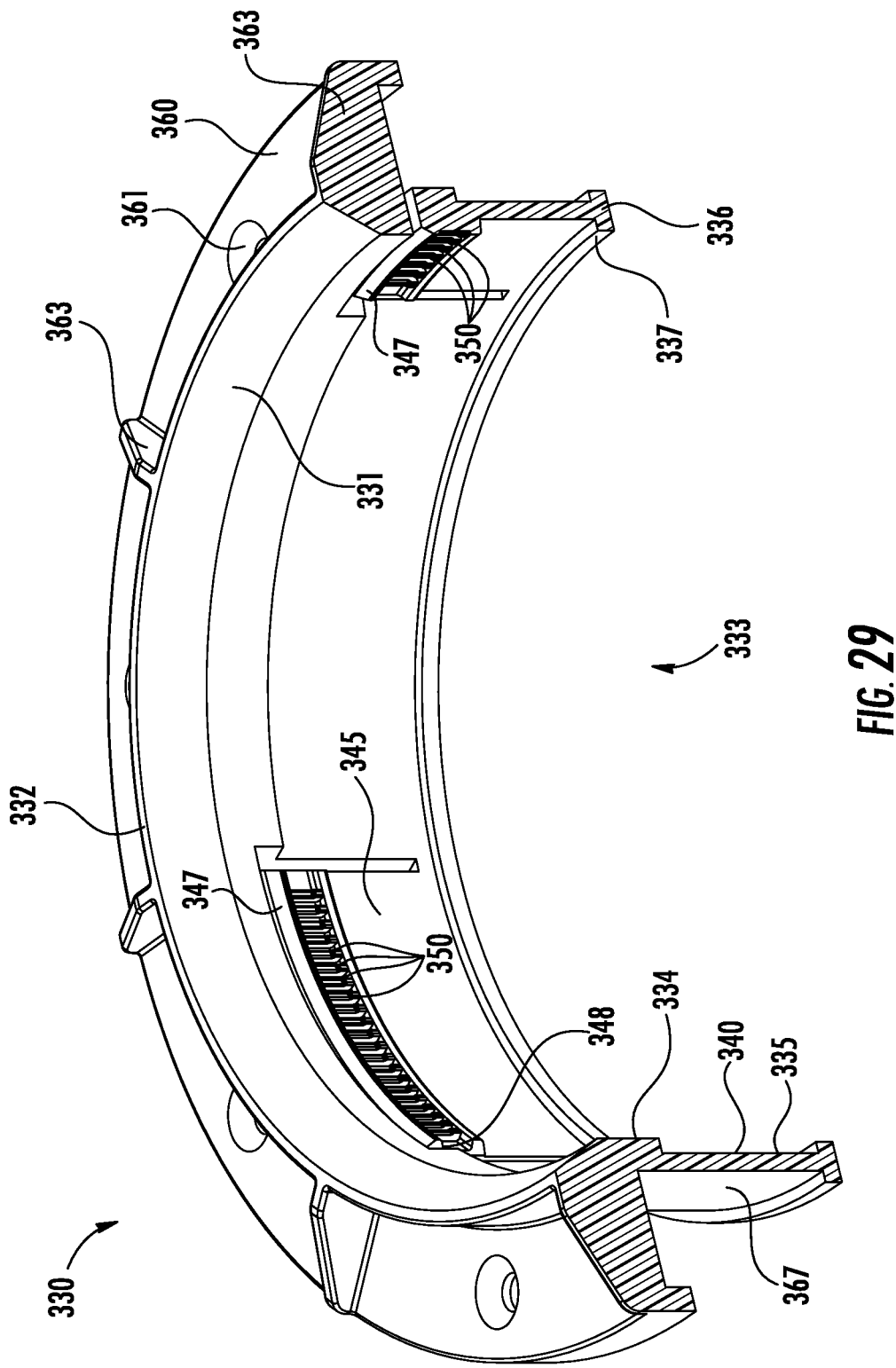
FIG. 29 is a sectional view taken generally along line 29-29 in FIG. 28.
Figure 30:
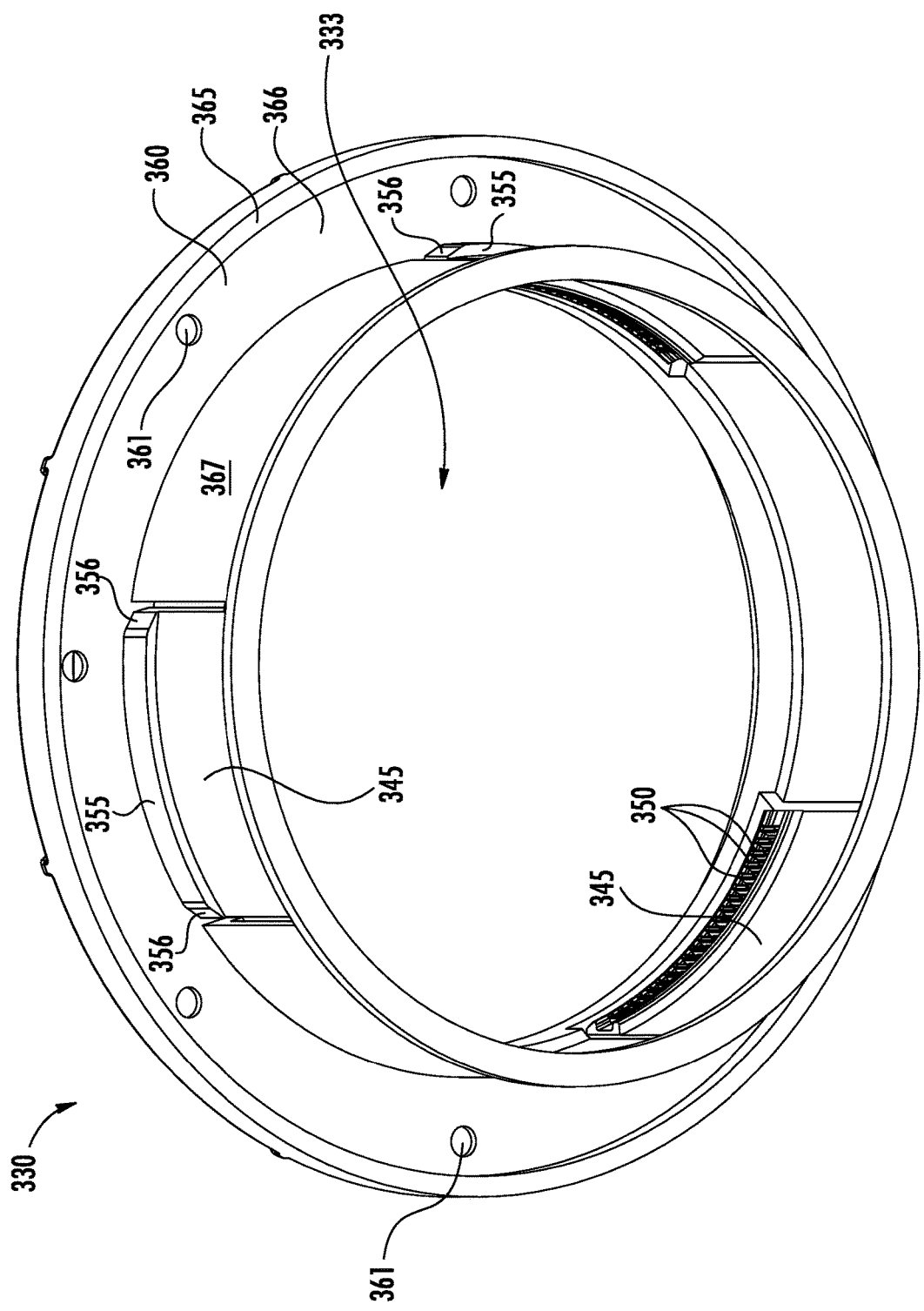
FIG. 30 is a perspective view of the locking member of FIG. 28 but taken from a perspective below the locking member.

Referring to FIGS. 28-30, locking member 330 is generally annular with an upper tapered inlet section 331 that tapers downward and inward from the upper surface 332 of the locking member to a central bore 333. The central bore 333 is stepped with an upper section 334 and a lower section 335. The lower section 335 has a larger diameter than the upper section 334. Lower section 335 may have an annular flange 336 along a lower edge thereof with the inner surface 337 of the flange having the same diameter as the upper section 334.

Lower section 335 may have a plurality of deflectable locking arms 345 that extend upward generally from adjacent the flange 336 towards the tapered inlet section 331. As depicted, locking member 330 has three locking arms 345 that extend generally along the inner surface 340 of the lower section 335 when in their undeflected state or position. The upper ends 346 of the locking arms 345 include a tapered surface 347 that tapers inward and downward from the upper surface of the locking arms. A lower surface 348 below the tapered surface 347 defines a locking surface for engaging inner valve member 235. The locking surface also prevents removal of the inner valve member 235 from the base assembly 300.

The locking arms 345 further include a plurality of spaced apart projections or teeth 350 that extend laterally or radially inward adjacent and beneath the lower surface 347. The teeth 350 are configured to lockingly engage the teeth 252 along the outer surface of the annular portion 250 of inner valve member 235. In other words, the teeth 252 and the teeth 350 are complimentarily configured so that recesses between adjacent teeth of one component (i.e., inner valve member 235 or locking member 330) lockingly receive the teeth from the other component. Engagement between the teeth and recesses will lock inner valve member 235 relative to locking member 330 and thus prevent relative rotational movement. As depicted, the teeth 252, 350 have generally rectangular cross-sections that are dimensioned so that the teeth 252 of inner valve member 235 and teeth 350 of locking member 330 interlock and prevent relative rotation between the inner valve member and the locking member. Other configurations of teeth 252, 350 are contemplated that provide a locking functionality through complimentary interengaging teeth or projections.

The inner edge of tapered surface 347 may extend further radially inward towards the center of central bore 333 than the radially inward edge or surface of the teeth 350. Through such a configuration, the lower surface or outer edge of teeth 252 of inner valve member 235 may engage the tapered surface 347 as the valve assembly 230 is inserted into the base assembly 300 to deflect the locking arms 345.

As best seen in FIG. 30, a radially outer portion (i.e., opposite teeth 350) of each locking arm 345 includes an engagement rib or circumferential cam follower 355 that extends circumferentially along the upper end 346 of each locking arm. The circumferential cam follower 355 may include a ramp or tapered end surface 356 at an end of the cam follower.

Figure 34:
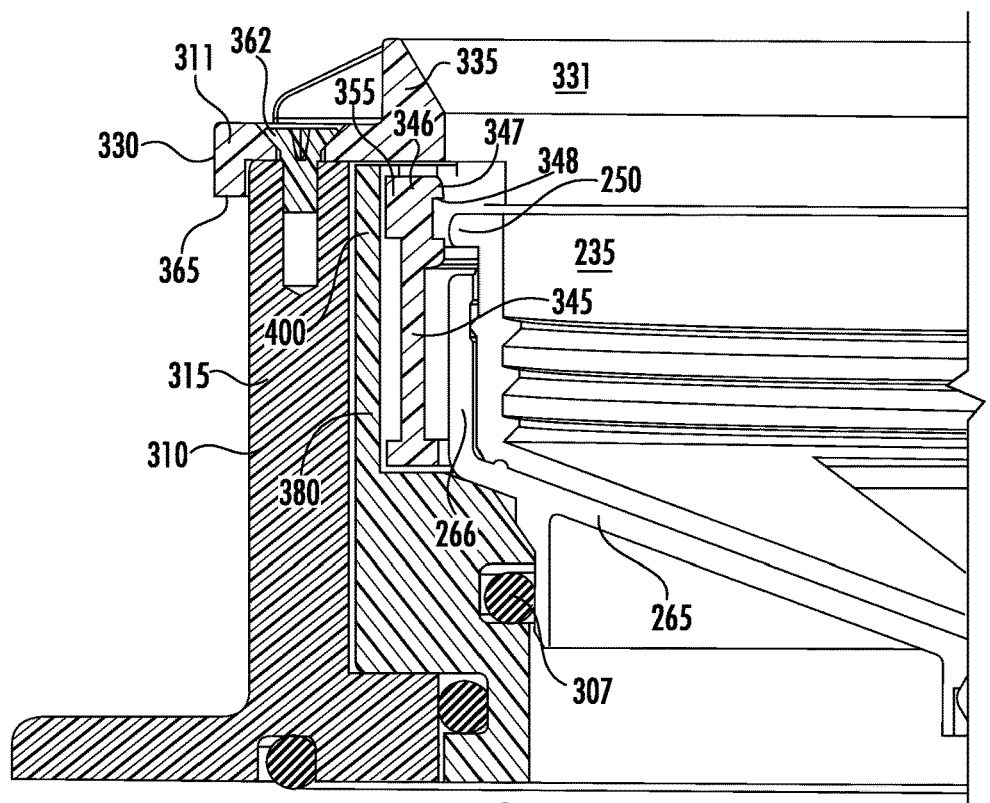
FIG. 34 is an enlarged diagrammatic view of a portion of the valve assembly inserted into the base assembly with the locking arm of the locking member in an unlocked position.

Locking arms 345 are configured to be movable between a first, undeflected position (FIG. 34) at which the teeth 350 are spaced from the teeth 252 of inner valve member 235 and a second, deflected position (FIG. 35) at which the teeth 350 of the locking member 330 engage and interlock with the teeth 252 of the inner valve member 235. The first, undeflected position corresponds to a load/unload position at which the valve assembly 230 is closed and may be inserted (i.e., loaded) into and removed (i.e., unloaded) from the base assembly 300. The second, deflected position corresponds to an operative or open valve position at which the valve assembly 230 is open and locked within the base assembly 300.

Locking member 330 has an upper annular mounting flange 360 with a plurality of bores or through-holes 361 that are configured to be aligned with the bores 321 in the upper surface 322 of base member 310. Fasteners such as screws 362 (FIG. 18) may pass through bores 361 in the flange 360 and be secured to the bores 321 to secure the locking member 330 to the base member 310. A plurality of support ribs or gussets 363 may extend along flange 360 to provide additional rigidity and also support the tapered inlet section 331. The flange 360 includes a downwardly depending annular lip or projection 365 that defines a space 366 between the lip and the outer surface 367 of the upper section 334 that is wider than the thickness of the upper section 317 of base member 310 (FIG. 20).

Figure 31:
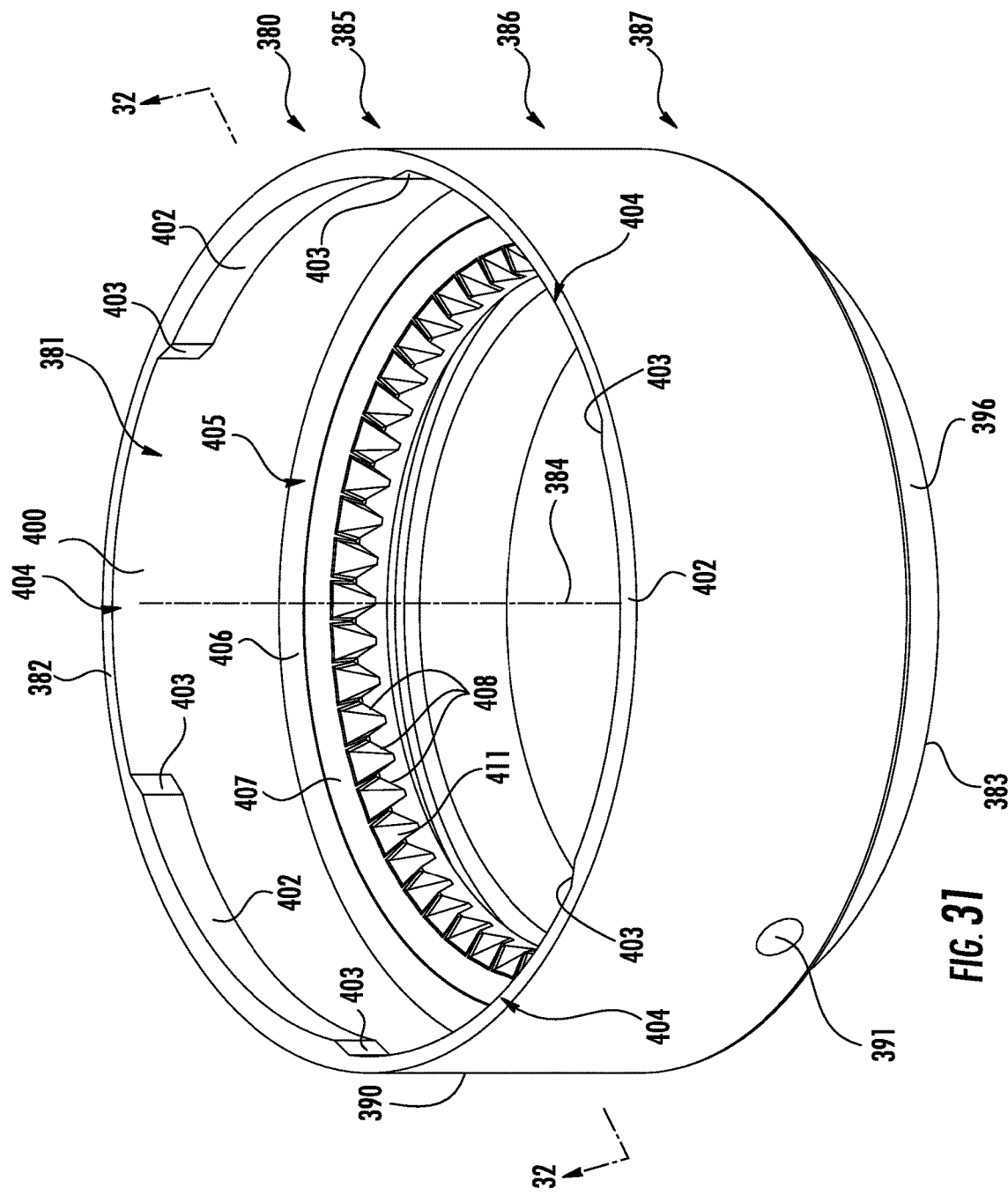
FIG. 31 is a perspective view of an actuator of the base assembly of FIG. 19.
Figure 32:
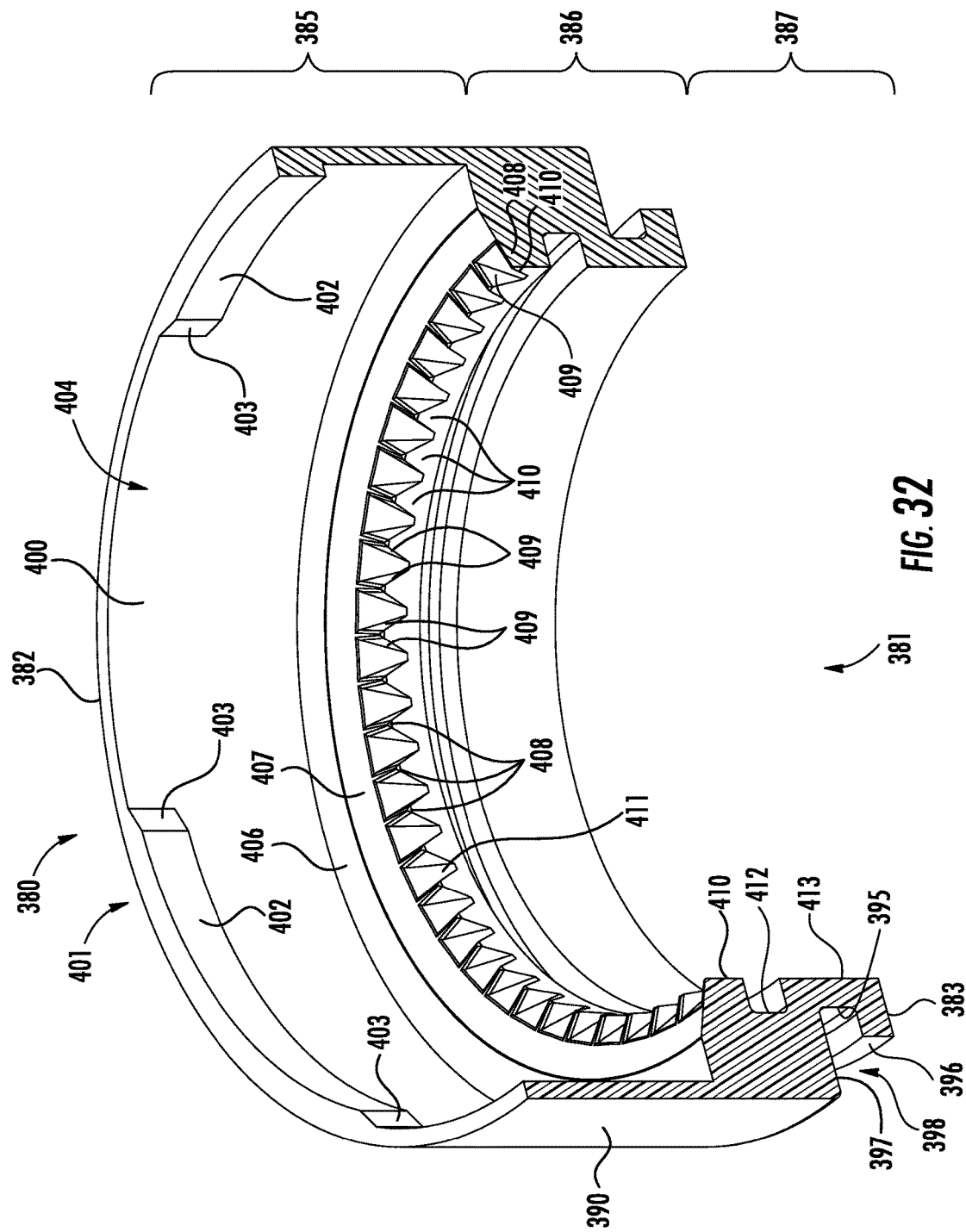
FIG. 32 is a sectional view taken generally along line 32-32 in FIG. 31.
Figure 33:
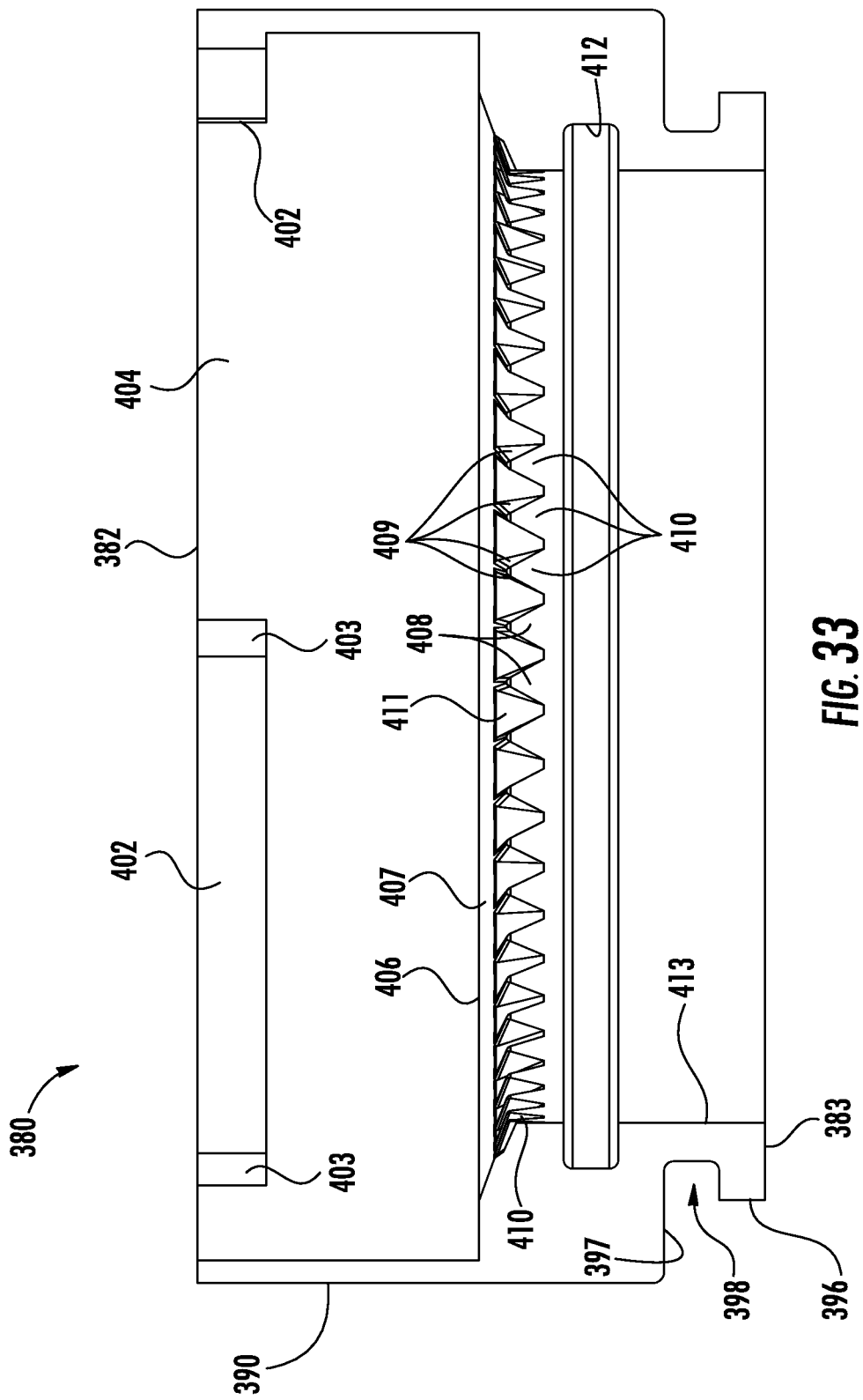
FIG. 33 is a side view of the actuator of FIG. 32.

Referring to FIGS. 31-33, actuator 380 is generally annular and has a central bore 381. The actuator 380 includes an upper section 385 that extends downward from an upper surface 382 of the actuator, a central section 386 that extends from the upper section downward towards the lower surface 383 of the actuator, and a lower section 387 extending from the middle section to the lower surface of the actuator. The outer surface 390 of both upper section 385 and central section 386 has a generally continuous circular diameter. Outer surface 390 may include a bore 391 therein into which a mounting portion 376 of handle 375 (FIG. 18) may be disposed.

The outer profile or surface 395 of lower section 387 has a circular diameter that is smaller than that of upper section 385. An annular ridge 396 extends radially outward from the outer surface 395 adjacent the lower surface 383 of the actuator 380. The smaller diameter of the lower section 387 defines a lower surface or ledge 397. Outer surface 395 of lower section 387, ridge 396, and lower surface 397 define an annular groove 398 configured to receive an O-ring 306 therein to assist in sealing actuator 380 to the base member 310.

The inner profile or surface 400 of upper section 385 of actuator 380 includes actuator section 401 having a plurality of spaced apart, horizontally aligned engagement ribs or circumferential cams 402 that extend circumferentially inward from inner surface 400 adjacent the upper surface 382 of the actuator 400. Each circumferential cam 402 includes a ramp or tapered end surface 403 at an end of the cam. Gaps or openings 404 extend between adjacent pairs of circumferential cams 402.

The inner profile or surface 405 of central section 386 includes a flat, horizontal annular surface 406 that extends radially inward from the inner surface 400 of upper section 385. A lead-in or angled annular surface 407 tapers downward and inward from the annular surface 406 towards central axis 384 of actuator 380. The angled surface 407 leads to a plurality of upwardly projecting tapered engagement tabs or projections 408. Each projection 408 is configured as a triangular pyramid with tapered side surfaces 409, a vertical outer surface 410, and a surface that extends along a second tapered or angled annular section 411. The projections 408 are equally spaced apart with generally identically shaped recesses 415 between each pair of projections.

The projections 408 are configured to lockingly engage the recesses 285 of outer valve member 265 and the projections 282 extending from the mounting surface 281 of the outer valve member are configured to lockingly engage the recesses 415 of actuator 380. In other words, the projections 282 and recesses 415 and the projections 408 and recesses 285 are complimentarily configured so that engagement between the projections and recesses will align and lock outer valve member 265 relative to actuator 380 and thus prevent relative rotational movement. As depicted, the projections 282, 408 are generally triangular pyramid shaped and are dimensioned to define a continuous array of projections and recesses. The projections of outer valve member 265 are received within the recesses of actuator 380 and the projections 408 of the actuator 380 are received within the recesses of the outer valve member to interlock and prevent relative rotation between the outer valve member and the actuator. The tapered or angled surfaces of the projections 282, 408 permit the outer valve member 280 (and thus valve assembly 230) to rotate slightly to self-align while being inserted into base assembly 300 and thus permit the valve assembly to be inserted into the base assembly in any orientation.

Projections 282, 408 having other configurations are contemplated that provide locking and self-aligning functionality through complimentary interengaging teeth or projections.

A lower portion of the inner surface 405 of central section 386 of actuator 380 may include an annular groove 412 configured to receive an O-ring 307 therein to assist in sealing actuator 380 to the outer valve member 265. The inner surface 413 of lower section 387 is generally aligned with outer surfaces 410 of projections 408.

To assemble base assembly 300, O-ring 306 is inserted into annular groove 398 of actuator 380 and O-ring 307 is inserted into annular groove 412. Base member 310 and actuator 380 are aligned along a central axis 231 as depicted in FIG. 18. Actuator 380 is moved relatively towards the base member 310 until the lower surface 397 of actuator 380 is adjacent the upper surface 322 of lower section 320 of base member 310. In this configuration, O-ring 306 engages the inner surface 321 of lower section 320 to create a seal between the base member 310 and the actuator 380.

The combined assembly of the base member 310 and actuator 380 is aligned with the locking member 330 along central axis 231 and rotated relatively so that the circumferential cam follower 355 of each locking arm 345 is positioned in one of the gaps 404 between adjacent pairs of circumferential cams 402 of the actuator 380. Locking member 330 is moved relatively towards the base member/actuator assembly until a lower surface of the flange 360 engages the upper surface 327 of the base member 310. The locking member 330 may be rotated into alignment with the base member 310 during the process of aligning the locking member with the base member along central axis 231 so that the bores 361 in the flange 360 of locking member 330 are aligned with bores 326 in the upper surface 327 of base member 310. Screws 362 are passed through bores 361 in flange 360 and secured to bores 326 to fix the locking member 330 to the base member 310.

The base member 310 and locking member 330 are configured so that securing the locking member to the base member creates a cavity 370 (FIG. 20) within which the upper section 385 of actuator 380 is disposed. The actuator 380 is rotatable relative to the assembly of the base member 310 and locking member 330. Rotation of the actuator 380, such as with handle 376, will cause the cams 402 to contact the circumferential cam followers 355 on the locking arms 345 which results in the deflection of the locking arms from their first, load/unload position to their locked position.

Each of the components of the valve assembly 230 and the base assembly 300 may be formed from any desired material. In one example, some or all of the components may be made of high density polyethylene, polypropylene, or any other material.

To utilize the valve assembly 230 and base assembly 300 within a closed loop material feed system, the base assembly 300 is mounted on and secured to any desired structure such as a feed mechanism 22. Fasteners (not shown) may be inserted through bores 312 in the flange 311 of the base member 310 to secure the base assembly 300 to the feed mechanism 22.

Valve assembly 230, in a closed condition, is secured to the tapered discharge section 24 of container 21 in any desired manner. In one embodiment, the tapered discharge section 24 of container 21 may include a plurality of threads (not shown) and the valve assembly 30 is secured to the tapered discharge section by rotating the valve assembly 230 relative to the container 21 so that the threads 27 of the valve assembly engage the threads of the tapered discharge section.

Figure 21:
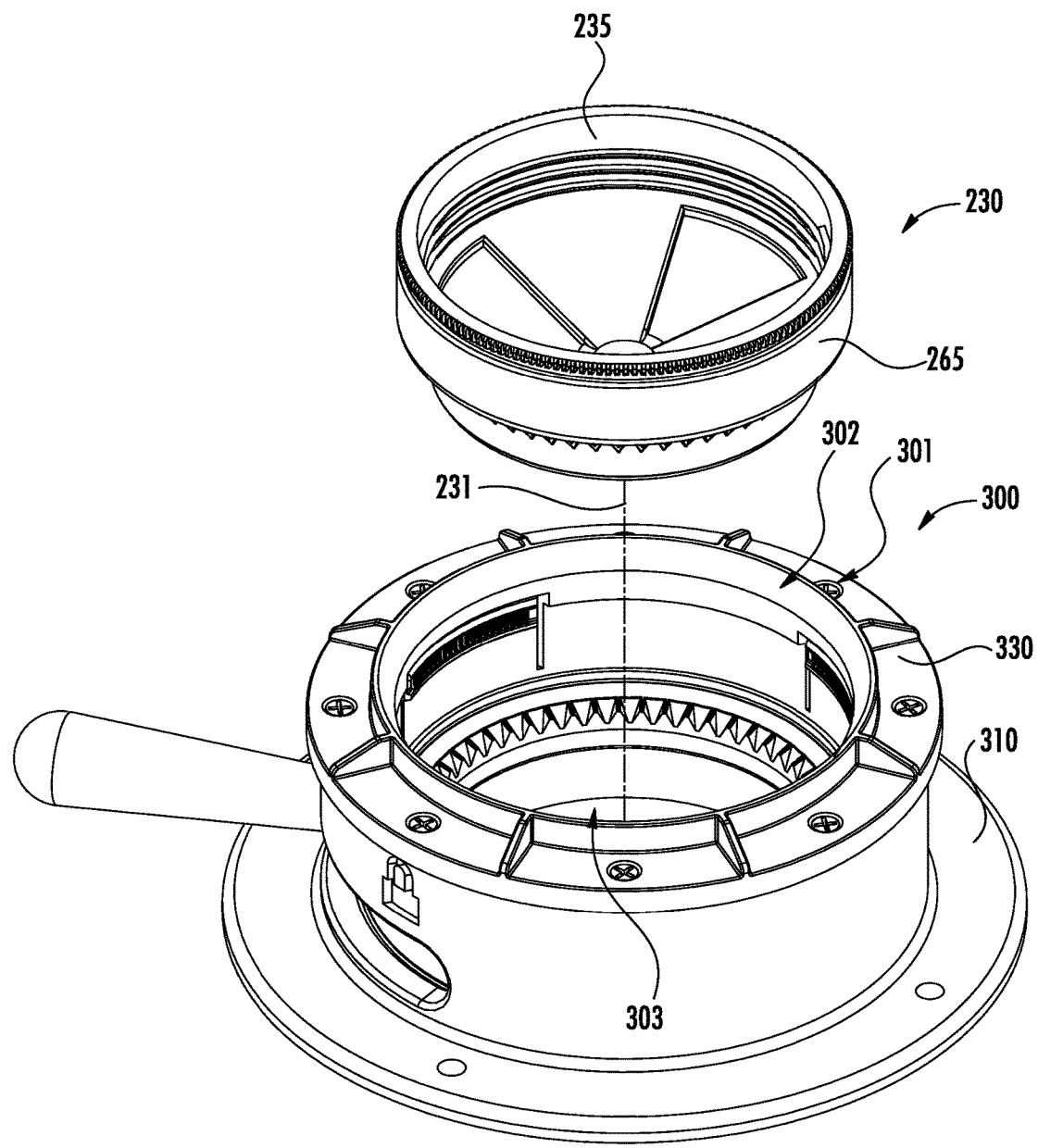
FIG. 21 is a perspective view of the valve assembly and base assembly of FIG. 19 prior to insertion of the valve assembly into the base assembly.
Figure 36:
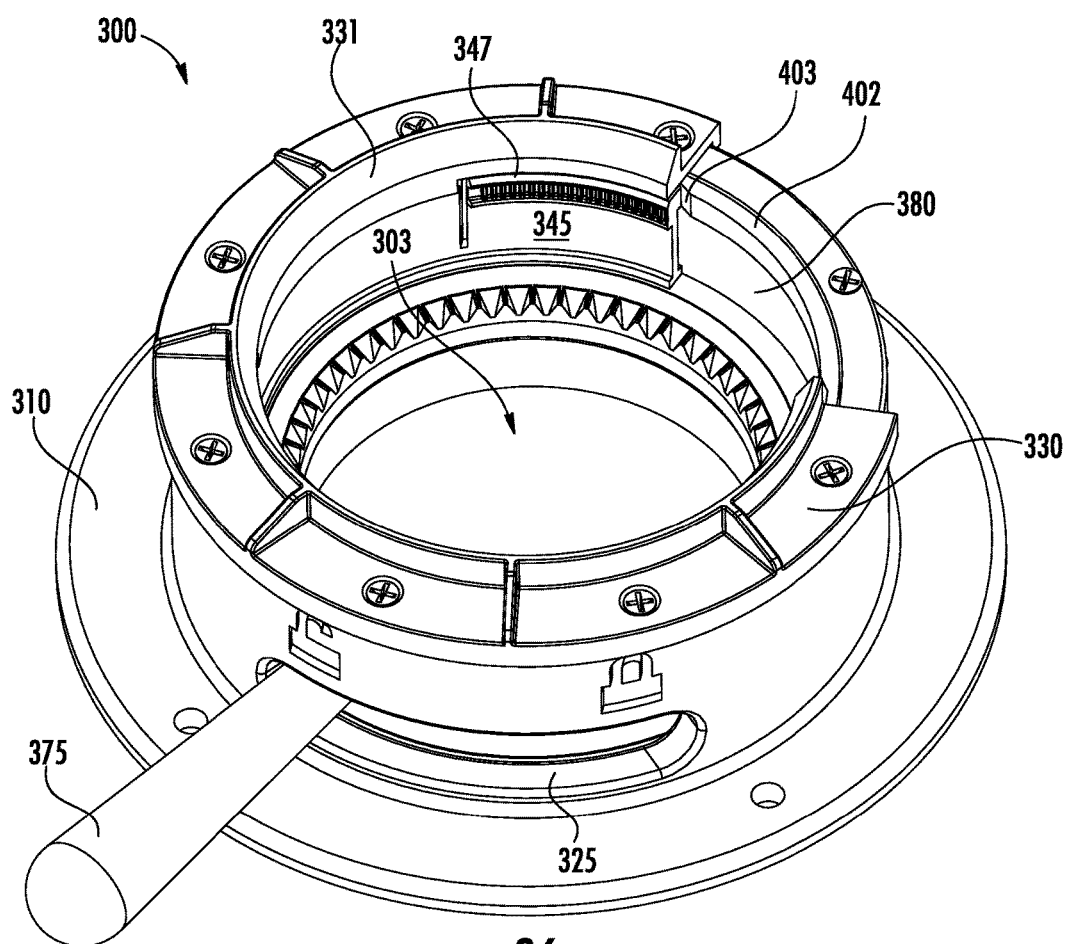
FIG. 36 is a partially fragmented perspective view of the base assembly in an unlocked position.
Figure 37:
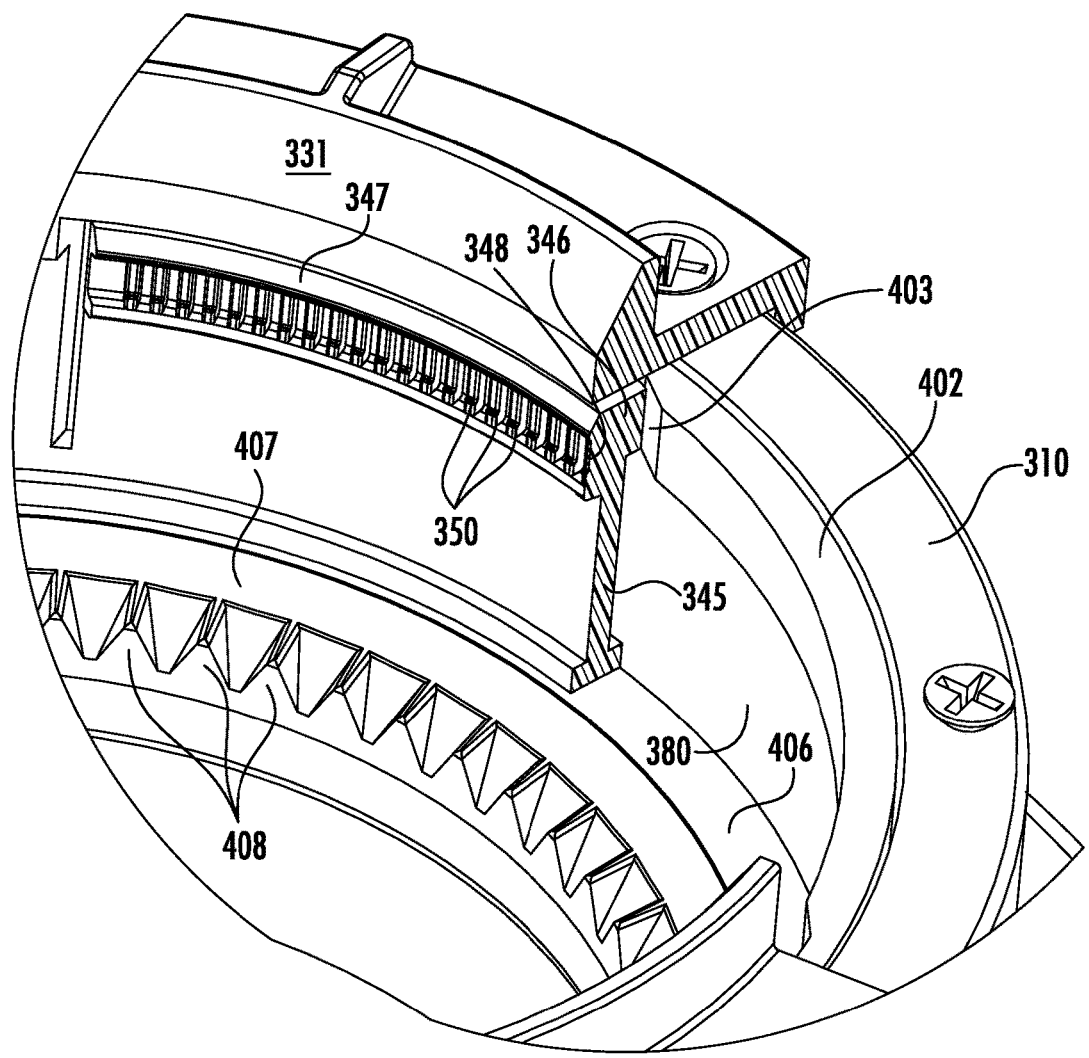
FIG. 37 is an enlarged view of a portion of FIG. 36.

To mount the container 21 and valve assembly 230 on the base assembly 300, the container and valve assembly are positioned above the base assembly along central axis 231 as depicted in FIG. 21. The base assembly is in its open or load/unload position as depicted in FIGS. 36-37. The valve assembly 230 is moved relatively towards the base assembly 300 so that the valve assembly is inserted into the central receptacle 301 of the base assembly.

During the insertion process, the lower outer edge 251 of the annular portion 250 of inner valve member 230 may engage the tapered surface 347 of the locking arms 345 which will cause the locking arms to deflect radially outward and permit the valve assembly to be inserted into central receptacle 301. In addition, the downwardly extending engagement projections 282 on the outer valve member 265 will engage the upwardly extending, complimentary shaped, engagement projections 408 of actuator 380. If the engagement projections 282, 408 are aligned, valve assembly 230 may be directly inserted into central receptacle 301.

If the engagement projections 282, 408 are not aligned, continued insertion movement of the valve assembly 230 relative to the base assembly 300 will cause relative rotational movement between the valve assembly and the base assembly to align the projections. Upon alignment of the engagement projections 282, 408, the radially outwardly extending teeth 252 on inner valve member 235 will also be aligned with, but spaced from, the complimentary shaped, radially inwardly extending teeth 350 on the locking arms 345 of locking member 330. O-ring 307 also forms a seal between the valve assembly 230 and the base assembly 300.

Figure 35:
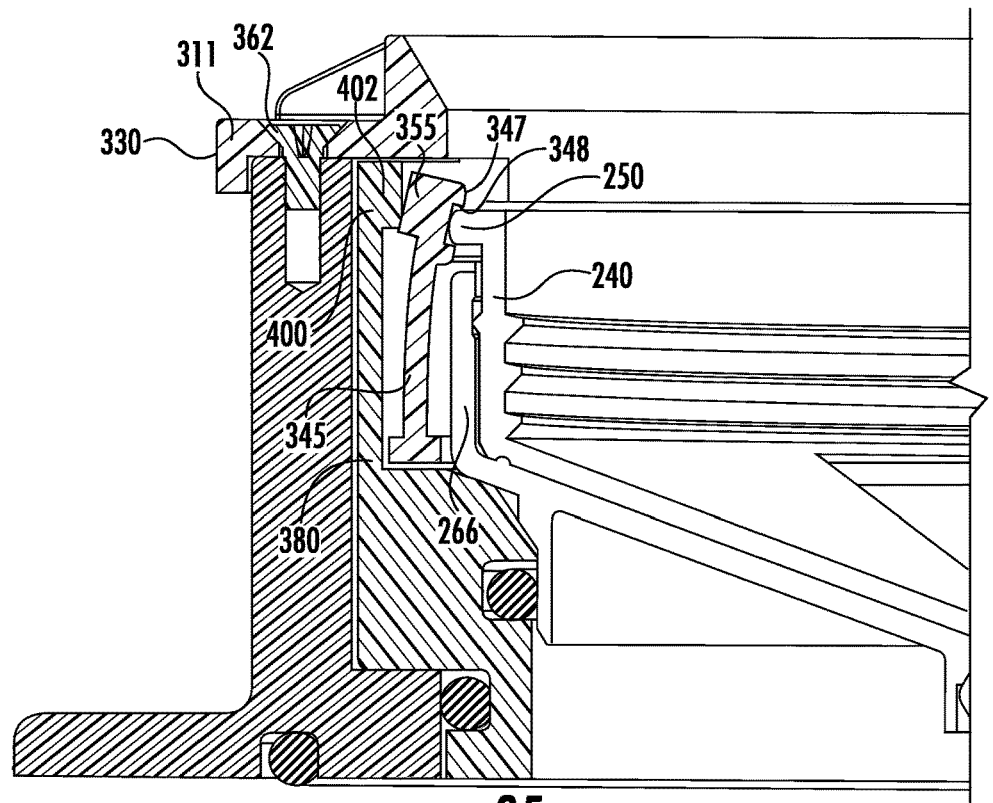
FIG. 35 is an enlarged diagrammatic view similar to FIG. 34 but with the locking arm in a locked position.

Manual engagement of handle 375 to slide the handle along slot 325 in the opening direction causes the rotation of actuator 380 within base assembly 300. Rotation of the actuator 380 causes horizontal rotational movement of each circumferential cam 402 so that the tapered end surface 403 of each cam begins to engage the tapered end surface 356 of each circumferential cam follower 355 of locking arms 345. Continued rotation of the actuator 380 causes the tapered end surfaces 403 of cams 402 to slide along the tapered end surfaces 403 which results in the radially inward deflection of the locking arms 345 as depicted in FIG. 35. The inward deflection results in the locking arms 345 moving from their load/unload positions to their operative or open valve positions. In the operative or open valve position, the teeth 350 of the locking arms engage the teeth 252 of the inner valve member 235. In addition, movement of the locking arms 345 to the open valve position also moves the lower surface 348 of each locking arm 345 over the inner valve member 235 to define a locking surface that prevents the removal of the valve assembly 230.

Figure 38:
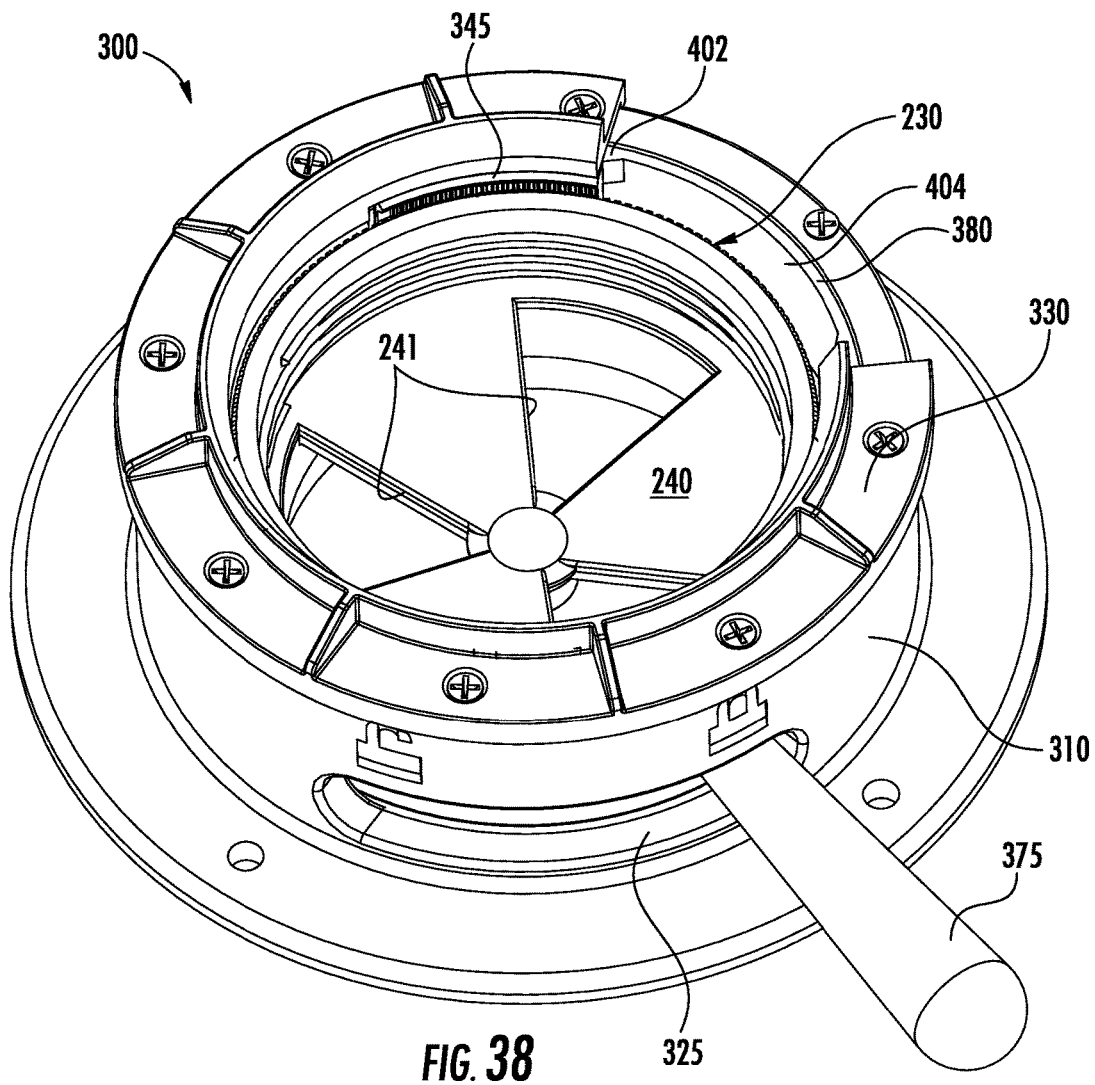
FIG. 38 is a partially fragmented perspective view similar to FIG. 36 but with the valve assembly inserted therein and the handle and actuator moved to a locked position.
Figure 39:
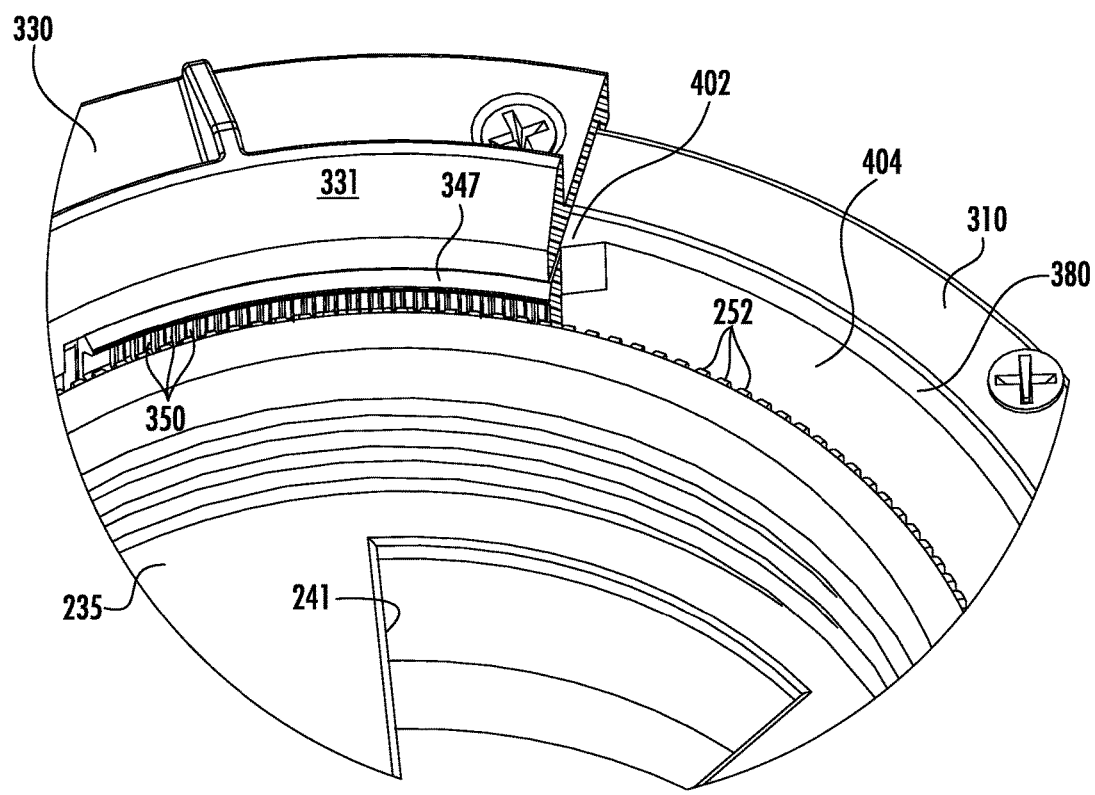
FIG. 39 is an enlarged view of a portion of FIG. 38.

During rotation of the handle 375 and actuator 380, a rotational force is transferred to the outer valve member 265 through the projections 282 on the outer valve member and the projections 408 on the actuator so that the outer valve member 265 rotates with the actuator. During such rotation, the cams 402 of actuator 380 will slide along the cam followers 355 of locking arms 345 so that the locking arms remain in their operative or open valve position and locked to the inner valve member 235. In addition, the sealing channels 43 in the lower surface 44 of discharge section 40 of inner valve member 235 will rotate away from their respective projections 73 surrounding each opening 71 in the outer valve member 265. The handle 375 and actuator 380 may continue to be rotated until the handle reaches the end of the circumferential slot 325 as depicted in FIGS. 38-39. In instances in which locking channels 45 are provided that encircled the openings 41 in the discharge section 40 of the inner valve member 235, the projection 73 surrounding each opening 71 may engage the locking channels to hold or retain the valve assembly 230 in an open position while the material is discharged from the container 21.

Since the lower surface 348 of each locking arm 345 is positioned over the inner valve member 235 while the valve assembly 230 is open, the container 21 and valve assembly 230 may not be removed from the base assembly 300 while the valve assembly is in its open position. In other words, while the valve assembly 230 is in its open position, the locking arms 345 prevent the removal of the valve assembly 230 from the base assembly 300.

To remove the container 21 and valve assembly 230 from the base assembly 300, the handle 375 and actuator 380 are rotated back to their closed position, which also causes the rotation of the outer valve member 265 to its closed position (i.e., the valve assembly is in its closed position). Rotating the actuator 380 to its closed position causes movement relative to the locking member 330 so that the cams 402 slide along the cam followers 355 of locking arms 345 with the cam followers moving towards the openings 404 between adjacent pairs of cams. As the tapered end surfaces 356 of cam followers 355 slide along the tapered end surface 403 of cams 402, the resilient nature of the locking arms 345 causes the locking arms to deflect back to their undeflected, load/unload positions. At the load/unload position, the lower surface 348 of each locking arm 345 is displaced away from (i.e., does not overlie) the inner valve member 235 and the teeth 350 of the locking arms are displaced from the teeth 252 of the inner valve member 235. The valve assembly 230 may then be removed from the base assembly 300 by vertical movement of the valve assembly relative to the base assembly.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

All references, including publications, patent applications, and patents, cited herein are hereby incorporated by reference to the same extent as if each reference were individually and specifically indicated to be incorporated by reference and were set forth in its entirety herein.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A material supply assembly comprising:
   a valve assembly including:
   an outer valve member and an inner valve member,
   the outer valve member including an outer discharge section, the outer discharge section including a plurality of first openings therein,
   the inner valve member including an inner discharge section, the inner discharge section including a plurality of second openings therein;
   the inner valve member being rotatably disposed on the outer valve member and rotatable relative to the outer valve member between a closed position at which the valve assembly is closed and an open position at which the valve assembly is open, the plurality of first openings being aligned with the plurality of second openings at the open position;
   a base assembly having a receptacle with an inlet and an outlet, the inlet being configured to receive at least a portion of the valve assembly therein and the outlet being configured to pass material therethrough, the base assembly including a base structure and an actuator, the actuator being movable relative to the base structure;
   an engagement structure between the outer valve member and the actuator, the engagement structure including a plurality of spaced apart first engagement members on one of the outer valve member and the actuator and a plurality of complementary configured second engagement members on another of the outer valve member and the actuator, the first engagement members being configured to lockingly engage the second engagement members to prevent relative movement between the outer valve member and the actuator; and
   a locking structure between the inner valve member and the base structure, the locking structure including a plurality of spaced apart first locking members on one of the inner valve member and the base structure and a plurality of complementary configured second locking members on another of the inner valve member and the base structure, wherein each of the first and second locking members includes at least one of a projection and a recess, the first locking members being configured to lockingly engage the second locking members to prevent relative movement between the inner valve member and the base structure;
   whereby movement of the actuator relative to the base structure moves the outer valve member relative to the inner valve member to operate the valve assembly.

2. The material supply assembly of claim 1, wherein the locking structure includes a plurality of resilient locking arms, the resilient locking arms being movable between a first unlocked position and a second locked position, wherein at the first unlocked position, the first locking members are spaced from the second locking members, and at the second locked position, the first locking members engage the second locking members.

3. The material supply assembly of claim 2, wherein the actuator includes a plurality of cams, each cam being configured to engage one of the resilient locking arms to move the locking arms to the second locked position.

4. The material supply assembly of claim 3, wherein each cam is circumferential and extends about a portion of a circumference of the actuator.

5. The material supply assembly of claim 4, wherein each cam includes a tapered end surface disposed at a circumferential end of the cam.

6. The material supply assembly of claim 4, wherein the actuator further includes a circumferential opening between adjacent pairs of circumferential cams.

7. The material supply assembly of claim 2, wherein the base structure comprises a base member and a locking member secured to the base member, the locking member comprising the locking arms.

8. The material supply assembly of claim 1, wherein the locking structure further includes a locking surface configured to prevent removal of the inner valve member from the base assembly.

9. The material supply assembly of claim 8, wherein the locking structure includes a plurality of resilient locking arms, the resilient locking arms being movable between a first unlocked position and a second locked position, wherein at the first unlocked position, the first locking members are spaced from the second locking members and the locking surface is spaced from the inner valve member, and at the second locked position, the first locking members engage the second locking members and the locking surface overlies the inner valve member.

10. The material supply assembly of claim 9, wherein at the second locked position, the locking surface engages the inner valve member.

11. The material supply assembly of claim 1, wherein the first and second engagement members are complimentary shaped with tapered side surfaces to align the outer valve member relative to the actuator.

12. The material supply assembly of claim 1, wherein the outer valve member comprises an alternating array of first engagement projections and first recesses and the actuator comprises an alternating array of second engagement projections and second recesses, the second recesses being configured to receive the first engagement projections therein and the first recesses being configured to receive the second engagement projections therein to prevent relative rotation between the outer valve member and the actuator.

13. The material supply assembly of claim 12, wherein each of the first and second engagement projections and the first and second recesses include tapered side surfaces to align the outer valve member relative to the actuator.

14. The material supply assembly of claim 1, wherein the outer valve member includes an annular outer body section and the inner valve member includes an annular inner body section disposed adjacent the annular outer body section.

15. The material supply assembly of claim 1, wherein the first locking members comprise a plurality of first spaced apart locking projections and the second locking members comprise a plurality of second, spaced apart locking projections, the first locking projections and the second locking projections being configured to interlock.

16. A material supply assembly comprising:
   a valve assembly including:
   an outer valve member and an inner valve member,
   the outer valve member including an annular outer body section and an outer discharge section, the outer discharge section including a plurality of first openings therein,
   the inner valve member including an annular inner body section and an inner discharge section, the inner discharge section including a plurality of second openings therein;
   the inner valve member being rotatably disposed on the outer valve member and rotatable relative to the outer valve member between a closed position at which the valve assembly is closed and an open position at which the valve assembly is open, the plurality of first openings being aligned with the plurality of second openings at the open position;

a base assembly having a receptacle with an inlet and an outlet, the inlet being configured to receive at least a portion of the valve assembly therein and the outlet being configured to pass material therethrough, the base assembly including a base structure and an actuator, the actuator being rotatable relative to the base structure;

an engagement structure between the outer valve member and the actuator, the engagement structure including a plurality of spaced apart first engagement members on one of the outer valve member and the actuator and a plurality of complementary configured second engagement members on another of the outer valve member and the actuator, the first engagement members being configured to lockingly engage the second engagement members to prevent relative rotation between the outer valve member and the actuator; and a locking structure between the inner valve member and the base structure, the base structure including a plurality of resilient locking arms, each locking arm including a plurality of spaced apart first locking members, the inner valve member including a plurality of complementary configured second locking members, wherein each of the first and second locking members includes at least one of a projection and a recess, the first locking members being configured to lockingly engage the second locking members to prevent relative rotation between the inner valve member and the base structure, each resilient locking arm being movable between a first unlocked position and a second locked position, wherein at the first unlocked position, the first locking members are spaced from the second locking members, and at the second locked B position, the first locking members engage the second locking members;

whereby rotation of the actuator relative to the base structure rotates the outer valve member relative to the inner valve member to operate the valve assembly.

17. The material supply assembly of claim 16, wherein the actuator includes a plurality of cams, each cam being configured to engage one of the resilient locking arms to move the locking arms to the second locked position.

18. The material supply assembly of claim 16, wherein the first locking members comprise a plurality of first spaced apart locking projections and the second locking members comprise a plurality of second, spaced apart locking projections, the first locking projections and the second locking projections being configured to interlock.

19. The material supply assembly of claim 16, wherein the base structure comprises a base member and a locking member secured to the base member, the locking member comprising the locking arms.

20. A material supply assembly comprising:
a valve assembly including:
an outer valve member and an inner valve member, the outer valve member including an annular outer body section and an outer discharge section, the outer discharge section including a plurality of first openings therein, the inner valve member including an annular inner body section and an inner discharge section, the inner discharge section including a plurality of second openings therein;

the inner valve member being rotatably disposed on the outer valve member and rotatable relative to the outer valve member between a closed position at which the valve assembly is closed and an open position at which the valve assembly is open, the plurality of first openings being aligned with the plurality of second openings at the open position;

a base assembly having a receptacle with an inlet and an outlet, the inlet being configured to receive at least a portion of the valve assembly therein and the outlet being configured to pass material therethrough, the base assembly including an annular base structure and an annular actuator, the actuator being rotatable relative to the base structure;

an engagement structure between the outer valve member and the actuator, the engagement structure including a plurality of spaced apart first engagement members on one of the outer valve member and the actuator and a plurality of complementary configured second engagement members on another of the outer valve member and the actuator, the first engagement members being configured to lockingly engage the second engagement members to prevent relative rotation between the outer valve member and the actuator; and a locking structure between the inner valve member and the base structure, the base structure including a plurality of resilient locking arms, each locking arm including a plurality of spaced apart first locking members and a locking surface, the inner valve member including a plurality of complementary configured second locking members, wherein each of the first and second locking members includes at least one of a projection and a recess, the first locking members being configured to lockingly engage the second locking members to prevent relative rotation between the inner valve member and the base structure, the locking surface being configured to prevent removal of the inner valve member from the base assembly, each resilient locking arm being movable between a first unlocked position and a second locked position, wherein at the first unlocked position, the first locking members are spaced from the second locking members, and at the second locked position, the first locking members engage the second locking members and the locking surface overlies a portion of the inner valve member to prevent removal of the inner valve member from the base assembly;

whereby rotation of the actuator relative to the base structure rotates the outer valve member relative to the inner valve member to operate the valve assembly.

* * * * *

UNITED STATES PATENT AND TRADEMARK OFFICE
CERTIFICATE OF CORRECTION

PATENT NO. : 10,562,062 B2
APPLICATION NO. : 15/814726
DATED : February 18, 2020
INVENTOR(S) : Kenneth Thomas Dobizl et al.

Page 1 of 1

It is certified that error appears in the above-identified patent and that said Letters Patent is hereby corrected as shown below:

In the Claims

At Column 21, Line 38, delete "second locked B position" and insert --second locked position--

Signed and Sealed this
Ninth Day of June, 2020

Andrei Iancu
*Director of the United States Patent and Trademark Office*